(12) United States Patent
Hirotani et al.

(10) Patent No.: US 10,855,121 B2
(45) Date of Patent: Dec. 1, 2020

(54) ROTARY ELECTRIC MACHINE, ELECTRIC POWER STEERING DEVICE, AND METHOD OF MANUFACTURING A ROTARY ELECTRIC MACHINE

(71) Applicant: MITSUBISHI ELECTRIC CORPORATION, Chiyoda-ku (JP)

(72) Inventors: Yu Hirotani, Chiyoda-ku (JP); Kazumasa Ito, Chiyoda-ku (JP); Hiroko Ikeda, Chiyoda-ku (JP); Kodai Okazaki, Chiyoda-ku (JP); Shinichi Yamaguchi, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 46 days.

(21) Appl. No.: 16/079,000

(22) PCT Filed: Dec. 26, 2016

(86) PCT No.: PCT/JP2016/088711
§ 371 (c)(1),
(2) Date: Aug. 22, 2018

(87) PCT Pub. No.: WO2017/163523
PCT Pub. Date: Sep. 28, 2017

(65) Prior Publication Data
US 2019/0097474 A1   Mar. 28, 2019

(30) Foreign Application Priority Data

Mar. 24, 2016   (JP) .................................. 2016-059892

(51) Int. Cl.
*H02K 1/14* (2006.01)
*H02K 1/18* (2006.01)
(Continued)

(52) U.S. Cl.
CPC ........... *H02K 1/146* (2013.01); *B62D 5/0403* (2013.01); *H02K 1/14* (2013.01); *H02K 1/18* (2013.01);
(Continued)

(58) Field of Classification Search
CPC ............ H02K 1/146; H02K 1/18; H02K 1/14; H02K 1/2773; H02K 15/022; H02K 21/16;
(Continued)

(56) References Cited

U.S. PATENT DOCUMENTS 7,583,003 B2 * 9/2009 Miyashita .............. H02K 1/148
310/194
2005/0017594 A1   1/2005 Herp
(Continued)

FOREIGN PATENT DOCUMENTS

JP   61-4448 A    1/1986
JP   63-174531 A  7/1988
(Continued)

OTHER PUBLICATIONS

International Search Report dated Mar. 21, 2017 in PCT/JP2016/088711 filed Dec. 26, 2016.

*Primary Examiner* — Tulsidas C Patel
*Assistant Examiner* — Ahmed Elnakib
(74) *Attorney, Agent, or Firm* — Xsensus LLP

(57) ABSTRACT

Provided is a rotary electric machine capable of reducing an amount of leakage magnetic flux passing through connecting portions. A cutout portion is formed in the connecting portion so as to be located on a side closer to a magnetic air gap portion. The connecting portion has a slot portion-side thin connecting portion formed so as to be closer to a slot portion than the cutout portion. A slot projecting portion projecting from the slot portion toward the magnetic air gap portion with respect to the slot portion-side thin connecting
(Continued)

portion is formed in a portion of the connecting portion that is shifted in the circumferential direction from a portion of the connecting portion in which the slot portion-side thin connecting portion is formed. The slot projecting portion is arranged on each of circumferential sides of the cutout portion.

12 Claims, 20 Drawing Sheets

(51) Int. Cl.
*B62D 5/04* (2006.01)
*H02K 1/27* (2006.01)
*H02K 15/02* (2006.01)
*H02K 21/16* (2006.01)

(52) U.S. Cl.
CPC .......... *H02K 1/2773* (2013.01); *H02K 15/022* (2013.01); *H02K 21/16* (2013.01); *B62D 5/0424* (2013.01); *B62D 5/0463* (2013.01); *H02K 2201/03* (2013.01); *H02K 2213/03* (2013.01)

(58) Field of Classification Search
CPC .......... H02K 2201/03; H02K 2213/03; H02K 1/148; H02K 15/16; B62D 5/0403; B62D 5/0424; B62D 5/0463
USPC ........................................ 310/156.56; 29/596
See application file for complete search history.

(56) References Cited

U.S. PATENT DOCUMENTS

| | | | |
|---|---|---|---|
| 2005/0174007 A1* | 8/2005 | McClelland | H02K 7/083 310/216.121 |
| 2005/0269895 A1* | 12/2005 | Innami | B62D 5/0403 310/429 |
| 2007/0241629 A1* | 10/2007 | Ionel | H02K 1/141 310/214 |
| 2014/0339947 A1* | 11/2014 | Wen | H02K 15/022 310/194 |
| 2015/0042194 A1 | 2/2015 | Li et al. | |
| 2016/0172918 A1* | 6/2016 | Hirotani | H02K 3/28 310/198 |
| 2016/0181876 A1* | 6/2016 | Kawasaki | H02K 1/16 180/444 |
| 2016/0315508 A1 | 10/2016 | Li et al. | |
| 2016/0365756 A1 | 12/2016 | Li et al. | |
| 2016/0365757 A1 | 12/2016 | Li et al. | |
| 2016/0365781 A1 | 12/2016 | Li et al. | |
| 2018/0115202 A1* | 4/2018 | Hirotani | H02K 1/2706 |

FOREIGN PATENT DOCUMENTS

| | | |
|---|---|---|
| JP | 2-307339 A | 12/1990 |
| JP | 2003204638 * | 7/2003 |
| JP | 2004-304997 A | 10/2004 |
| JP | 2005-516574 A | 6/2005 |
| JP | 2005-237136 A | 9/2005 |
| JP | 2008-61368 A | 3/2008 |
| JP | 2015-37379 A | 2/2015 |
| WO | WO 2014/192130 A1 | 12/2014 |

* cited by examiner

424

ROTARY ELECTRIC MACHINE, ELECTRIC POWER STEERING DEVICE, AND METHOD OF MANUFACTURING A ROTARY ELECTRIC MACHINE

TECHNICAL FIELD

The present invention relates to a rotary electric machine including a rotor and a stator arranged with respect to the rotor through a magnetic air gap portion therebetween, an electric power steering device, and a method of manufacturing a rotary electric machine.

BACKGROUND ART

Hitherto, there has been known a rotary electric machine having increased rigidity by connecting distal ends of adjacent tooth portions of a stator core with use of connecting portions made of a magnetic material, in which each of the connecting portions has a thin portion with a thickness dimension along an axial center of the stator being set smaller than that of the other portion so that a leakage magnetic flux passing through the connecting portions is reduced (see, for example, Patent Literature 1).

CITATION LIST

Patent Literature

[PTL 1] JP 2004-304997 A

SUMMARY OF INVENTION

Technical Problem

In terms of ease of manufacture and a strength of the stator core, however, the thickness dimension of the thin portion of each of the connecting portions is required to be set equal to or larger than a given dimension. Therefore, there is a problem in a large amount of leakage magnetic flux passing through the connecting portions.

The present invention has been made to solve the problem described above, and provides a rotary electric machine, an electric power steering device, and a method of manufacturing a rotary electric machine, which are capable of reducing an amount of leakage magnetic flux passing through connecting portions.

Solution to Problem

According to one embodiment of the present invention, there is provided a rotary electric machine including: a rotor; and a stator including a stator core, the stator core including a core back portion having an annular shape and a plurality of tooth portions arranged at an interval in a circumferential direction of the stator to extend from the core back portion in a radial direction of the stator, the stator core having a slot portion formed between the plurality of tooth portions being adjacent to each other in the circumferential direction, the stator being arranged with respect to the rotor through a magnetic air gap portion therebetween, wherein each of the plurality of tooth portions includes a distal end being an end located on a side of the each of the plurality of tooth portions that is closer to the rotor, wherein the stator core further includes a connecting portion made of a magnetic material, which is formed at the distal end of each of the plurality of tooth portions and projects from the distal end of the each of the plurality of tooth portions in the circumferential direction to connect the plurality of tooth portions being adjacent to each other in the circumferential direction, wherein the connecting portion has a cutout portion formed on a side of the connecting portion that is closer to the magnetic air gap portion, wherein the connecting portion includes a slot portion-side thin connecting portion formed so as to be closer to the slot portion than the cutout portion, wherein a portion of the connecting portion that is shifted in the circumferential direction from a portion of the connecting portion in which the slot portion-side thin connecting portion is formed has formed therein a slot projecting portion projecting from the slot portion toward the magnetic air gap portion with respect to the slot portion-side thin connecting portion, and wherein the slot projecting portion is arranged on each of circumferential sides of the cutout portion, or the cutout portion is arranged on each of circumferential sides of the slot projecting portion.

Advantageous Effects of Invention

According to the rotary electric machine of the present invention, in the rotary electric machine in which the distal ends of the tooth portions of the stator core are connected to each other with use of the connecting portions, a length of a path for a leakage magnetic flux passing through the connecting portions can be increased. Therefore, the amount of leakage magnetic flux passing through the connecting portions can be reduced.

DESCRIPTION OF EMBODIMENTS

First Embodiment

Figure 1:
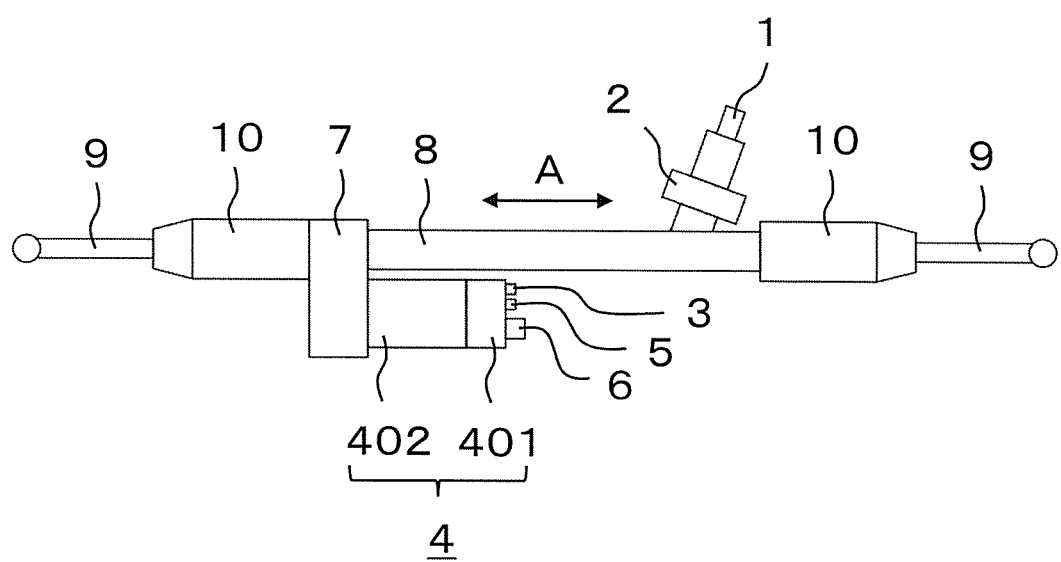
FIG. 1 is an explanatory view for illustrating an electric power steering device for an automobile according to a first embodiment of the present invention.

FIG. 1 is an explanatory view for illustrating an electric power steering device for an automobile according to a first embodiment of the present invention. A driver steers a steering wheel (not shown), and a torque generated by the steering is transmitted to a shaft 1 through intermediation of a steering shaft (not shown). At this time, information on the torque detected by a torque sensor 2 is converted into an electric signal and is then transmitted to an engine control unit (ECU) 401 of an electric driving device 4 through a connector 3 via a cable. Meanwhile, information on an automobile, for example, a vehicle velocity, is converted into an electric signal and is then transmitted to the ECU 401 through a connector 5. The ECU 401 calculates a required assist torque based on the information on the torque and the information on the automobile, for example, the vehicle velocity, and supplies current to a rotary electric machine 402 of the electric driving device 4 through an inverter.

The electric driving device 4 is arranged so as to be parallel to a direction of movement of a rack shaft. The direction of movement of the rack shaft is a direction indicated by the arrowed line A in FIG. 1. Power is supplied to the ECU 401 from a battery and an alternator through a power connector 6. A torque generated by the rotary electric machine 402 of the electric driving device 4 is decelerated by a gear box 7 including a belt and a ball screw (both not shown) built therein to generate a thrust force for moving a rack shaft (not shown) provided inside a housing 8 in the direction indicated by the arrowed line A, thereby assisting a steering force applied by the driver. In this manner, tie rods 9 are moved to roll tires to enable a vehicle to turn. With the assist of the torque generated by the rotary electric machine 402, the driver can turn the vehicle with a reduced steering force. Rack boots 10 are provided so as to prevent a foreign substance from entering the electric power steering device.

Figure 2:
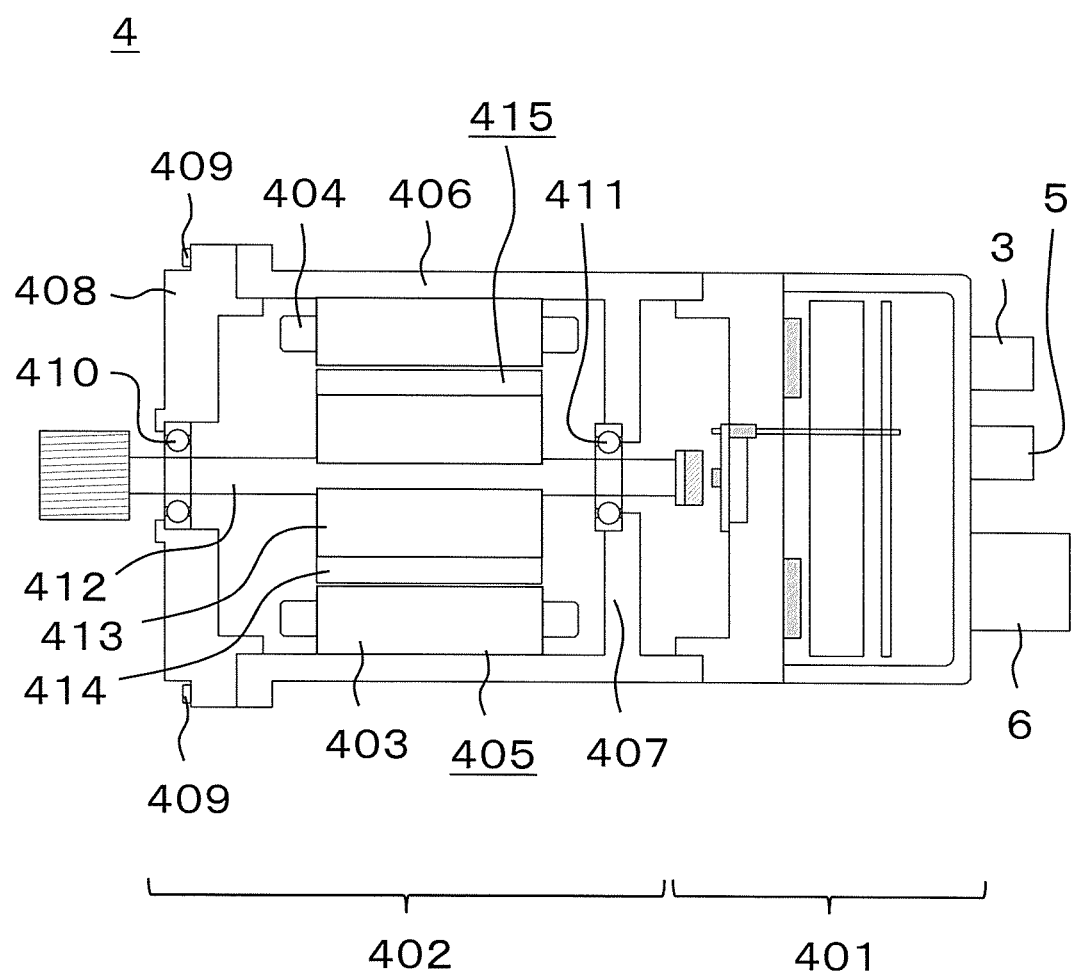
FIG. 2 is an explanatory view for illustrating an electric driving device of FIG. 1.

FIG. 2 is an explanatory view for illustrating the electric driving device 4 of FIG. 1. The electric driving device 4 has a structure in which the ECU 401 and the rotary electric machine 402 of the present invention are integrated with each other. The rotary electric machine 402 is now described. The rotary electric machine 402 includes a stator 405 including a stator core 403 and an armature winding 404 housed in the stator core 403, and a frame 406, to which the stator 405 is fixed. Further, the rotary electric machine 402 includes a wall portion 407 provided integrally with the frame 406, a housing 408 provided to the frame 406, and bolts 409, which are configured to fix the housing 408 to the frame 406. The housing 408 is arranged as a front part of the rotary electric machine 402. The front part is a left part of the rotary electric machine 402 in FIG. 2. The wall portion 407 may be provided independently of the frame 406.

Further, the rotary electric machine 402 includes a bearing 410 provided to the housing 408 and a bearing 411 supported on the frame 406. The bearing 411 is mounted to the wall portion 407. The bearing 410 is supported on the frame 406 through intermediation of the wall portion 407.

Further, the rotary electric machine 402 includes a rotor 415 including a rotary shaft 412 supported by bearing 410 and the bearing 411 so as to be freely rotatable, a rotor core 413 provided to the rotary shaft 412 and permanent magnets 414 provided to the rotor core 413. The rotary shaft 412 is press-fitted into a through hole formed in the rotor core 413. In this manner, the rotor core 413 is fixed to the rotary shaft 412. The permanent magnets 414 are fixed onto the rotor core 413. The term "cross section" hereinafter means a cross section cut along a plane perpendicular to the rotary shaft 412.

Figure 3:
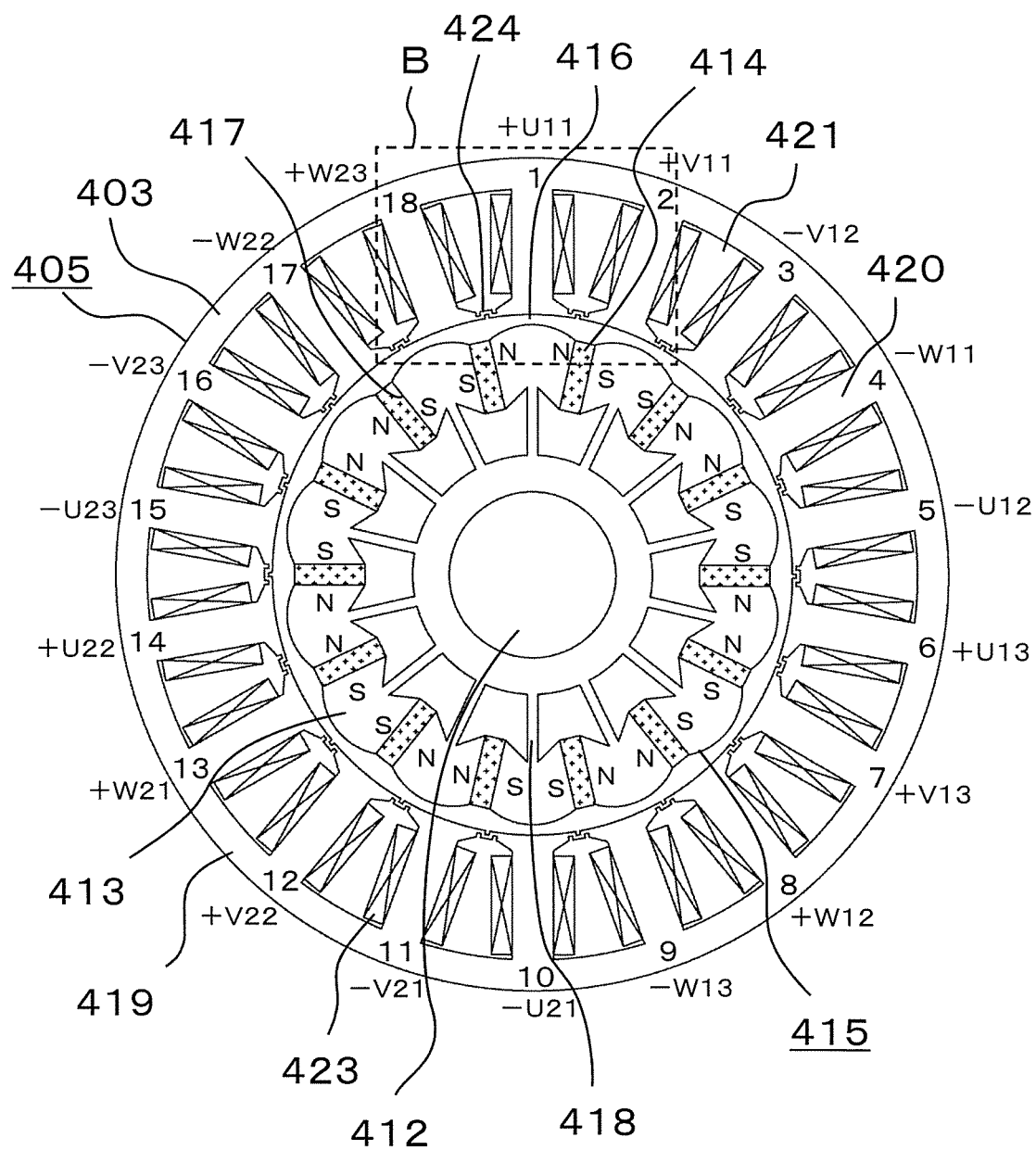
FIG. 3 is a sectional view for illustrating a rotary electric machine of FIG. 2.

FIG. 3 is a sectional view for illustrating the rotary electric machine 402 of FIG. 2. The rotary electric machine 402 is the rotary electric machine 402 including the rotor 415 having fourteen poles and the stator 405 having eighteen slots. On a radially inner side of the stator 405, the rotor 415 is provided so as to be freely rotatable through a magnetic air gap portion 416 therebetween. The magnetic air gap portion 416 is an air gap between the stator core 403 being a magnetic body of the stator 405 and the rotor core 413 and the permanent magnets 414, each being a magnetic body of the stator 405.

The rotor 415 includes the rotary shaft 412 and the rotor core 413 provided on a radially outer side of the rotary shaft 412. A plurality of permanent-magnet embedded portions 417 are formed on the rotor core 413. In this example, fourteen permanent-magnet embedded portions 417 are formed on the rotor core 413. The permanent-magnet embedded portions 417 are arranged equiangularly in a circumferential direction of the rotary electric machine 402. The permanent magnet 414 having a quadrangular sectional shape is embedded separately in each of the permanent-magnet embedded portions 417. Magnetic poles of the permanent magnets 414 are arranged equiangularly in the circumferential direction. The permanent magnets 414 are embedded in the permanent-magnet embedded portions 417 so that a radial length thereof is longer than a circumferential length thereof. Through use of the permanent magnets 414 each having the quadrangular sectional shape, processing cost for the permanent magnets 414 can be reduced. A magnetizing direction of the permanent magnets 414 is such that N and S indicated in FIG. 3 represent the N pole and the S pole, respectively. Specifically, the permanent magnets 414 are magnetized so that opposed surfaces of the adjacent permanent magnets 414 have the same polarity. Through setting of the magnetizing direction for the permanent magnets 414 in this manner, a magnetic flux can be concentrated in the rotor core 413 so as to increase a magnetic flux density of the rotor core 413.

The rotor core 413 is present between the adjacent permanent magnets 414. A surface of the rotor core 413 that is opposed to the stator 405 has a curved shape. The surface of the rotor core 413 that is opposed to the stator 405 has a convex curved shape so that an air gap length from the stator 405 becomes short at an intermediate point between the adjacent permanent magnets 414. In other words, the surface of the rotor core 413 that is opposed to the stator 405 has a convex curved shape with a circumferential intermediate portion projecting so as to be closer to the stator 405 than circumferential end portions. Through setting of the above-mentioned shape as the shape of the surface of the rotor core 413 that is opposed to the stator 405, a waveform of the magnetic flux density generated in the air gap between the rotor core 413 and the stator 405 can be smoothed. As a result, a cogging torque and a torque pulsation generated in the rotary electric machine 402 can be further reduced.

The rotor 415 includes a non-magnetic portion provided on a radially inner side of the permanent magnets 414. The non-magnetic portion may be, for example, a hollow filled with air or resin with which a hollow is filled. Further, the non-magnetic portion may be, for example, a non-magnetic metal such as stainless steel or aluminum inserted into a hollow. Through provision of the non-magnetic portion on the radially inner side of the permanent magnets 414, a leakage magnetic flux from the permanent magnets 414 can be reduced.

The rotary core 413 includes rotor core outer-diameter portions being portions arranged between the permanent magnets 414 adjacent to each other in the circumferential direction, a rotor core inner-diameter portion being a portion surrounding an outer periphery of the rotor shaft 412, and bridge portions 418 provided between the rotor core outer-diameter portions and the rotor core inner-diameter portion. The bridge portions 418 have a function to mechanically connect the rotor core outer-diameter portions and the rotor core inner-diameter portion. In this example, the bridge portions 418 are provided between all the rotor core outer-diameter portions and the rotor core inner-diameter portion. However, the arrangement of the bridge portions 418 is not limited thereto. Equivalent effects are obtained even when the bridge portions 418 are not provided between at least one of the rotor core outer-diameter portions and the rotor core inner-diameter portion. When the bridge portions 418 are not provided between at least one of the rotor core outer-diameter portions and the rotor core inner-diameter portion, a leakage magnetic flux passing through the rotor-core outer diameter portions for which the bride portions 418 are not provided and the rotor core inner-diameter portion can be reduced, and hence an average torque output from the rotary electric machine 402 can be increased.

With the configuration described above, the waveform of the magnetic flux density generated in the air gap between the rotor core 413 and the stator 405 is smoothed to reduce the cogging torque and the torque pulsation. At the same time, because of the larger radial length of each of the permanent magnets 414 than the circumferential length thereof, the magnetic flux can be concentrated in the rotor core 413. Accordingly, the torque output from the rotary electric machine 402 can be increased. Further, the permanent magnets 414 each having the quadrangular sectional shape can be used. Thus, the processing cost for the permanent magnets 414 can be reduced. Alternatively, a metal pipe, which is used to prevent magnet scattering, is not required, and hence cost of the rotary electric machine 402 can be reduced.

The stator 405 includes the stator core 403. The stator core 403 includes a core back portion 419 having an annular shape and a plurality of tooth portions 420, which are arranged equiangularly in the circumferential direction with intervals therebetween and project from the core back portion 419 toward the magnetic air gap portion 416. The stator core 403 has slot portions 421 formed between the tooth portions 420 adjacent to each other in the circumferential direction. The stator 405 further includes armature coils 423 housed in the slot portions 421 formed in the stator core 403. The slot portion 421 is a space surrounded by the adjacent tooth portions 420, the core back portion 419, and a connecting portion 424 described later. In this example, the number of tooth portions 420, the number of slot portions 421, and the number of armature coils 423 is each eighteen. The stator 405 further includes insulators (not shown) made of resin or the like, which are inserted between the tooth portions 420 of the stator core 403 and the armature coils 423. The insulators electrically insulate the tooth portions 420 and the armature coils 423 from each other.

Six U-phase armature coils 423, six V-phase armature coils 423, and six W-phase armature coils 423 are connected. In FIG. 3, +U11, −U12, +U13, −U21, +U22, and −U23 are U-phases, +V11, −V12, +V13, −V21, +V22, and −V23 are V-phases, and −W11, +W12, −W13, +W21, −W22, and +W23 are W-phases. The armature coils 423 are arranged in the order of: +U11, +V11, −V12, −W11, −U12, +U13, +V13, +W12, −W13, −U21, −V21, +V22, +W21, +U22, −U23, −V23, −W22, and +W23 so as to correspond to the numbers 1 to 18 of the tooth portions 420 illustrated in FIG. 3. The signs "+" and "−" indicate winding polarities of the coil, and the sign "+" and the sign " −" indicate winding polarities opposite to each other. The eighteen armature coils 423 are connected for each phase. Further, the armature coils 423 of each phase are connected to each other outside of the rotary electric machine 402. Through connection of the armature coils 423, the armature winding 404 is formed. To the armature coils 423, currents of 3n phases are supplied so as to correspond to the U-phase, the V-phase, and the W-phase. In this case, n is an integer of 1 or more. Through supply of the currents to the armature coils 423, the rotor 415 of the rotary electric machine 402 generates the torque.

The stator core 403 further includes the connecting portions 424 made of a magnetic material, each of which is provided to each of distal ends of the plurality of tooth portions 420 and projects from each of the distal ends of the plurality of tooth portions 420 in the circumferential direction to connect the tooth portions 420 being adjacent to each other in the circumferential direction. The distal end of the tooth portion 420 is an end of the tooth portion 420 that is located on a side closest to the rotor 415. The connecting portions 424 connect circumferentially adjacent circumferential ends of the distal ends of the tooth portions 420 being adjacent to each other. The number of connecting portions 424 is eighteen, which corresponds to the number of tooth portions 420.

When the rotary driving machine 402 is driven, such a radial electromagnetic force as to distort an inner periphery of the stator 405 acts on the radially inner portion of the stator 405. Through connection of the adjacent tooth portions 420 to each other with use of the connecting portions 424, a strength of an inner periphery of the stator core 403, which is located on a side closer to the rotor 415, can be increased in comparison to that in a case where the distal ends of the tooth portions 420 are not connected. In this manner, the rigidity of the stator 405 can be increased in comparison to the case where the distal ends of the tooth portions 420 are not connected to each other. As a result, oscillation of the rotary electric machine 402 can be reduced. Further, when the adjacent tooth portions 420 are connected to each other as described above, an opening of each of the slot portions 421, which is located on the side closer to the rotor 415, is closed. Therefore, the armature coils 432 can be prevented from projecting radially inward from the stator core 403. Further, a high-frequency component of slot permeance can be reduced. The reduction in high-frequency component of the slot permeance enables reduction in cogging torque and electromagnetic exciting force.

Figure 4:
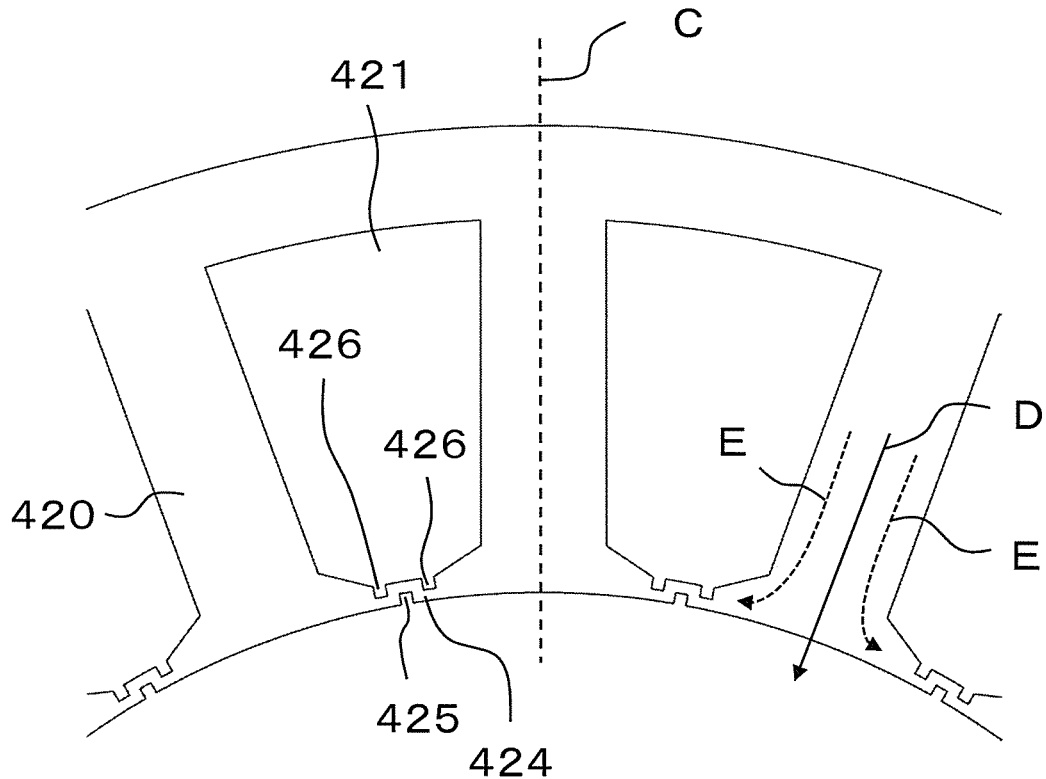
FIG. 4 is an enlarged view of a portion B of FIG. 3.

FIG. 4 is an enlarged view of a portion B of FIG. 3. In the first embodiment, end surfaces of the tooth portions 420 and the connecting portions 424 that are located on the side closer to the magnetic air gap portion 416 have a shape extending substantially along a cylinder having an axial center of the rotary shaft 412 as the center. A cutout portion 425 having an approximately quadrangular shape and projecting from the end surface toward the slot portion 421 is formed in the connecting portion 424. The cutout portion 425 is formed by cutting out the connecting portion 424. In other words, the cutout portion 425 is formed in a portion of the connecting portion 424 that is located on the side closer to the magnetic air gap portion 416. The cutout portion 425 has a given width in the circumferential direction. Further, slot projecting portions 426 each having an approximately quadrangular shape and projecting from the slot portion 421 toward the magnetic air gap portion 416 are formed in the connecting portion 424. The slot projecting portions 426 are formed by cutting out the connecting portion 424. In other words, the slot projecting portions 426 are formed in a portion of the connecting portion 424 that is located on the side closer to the slot portion 421.

Figure 5:
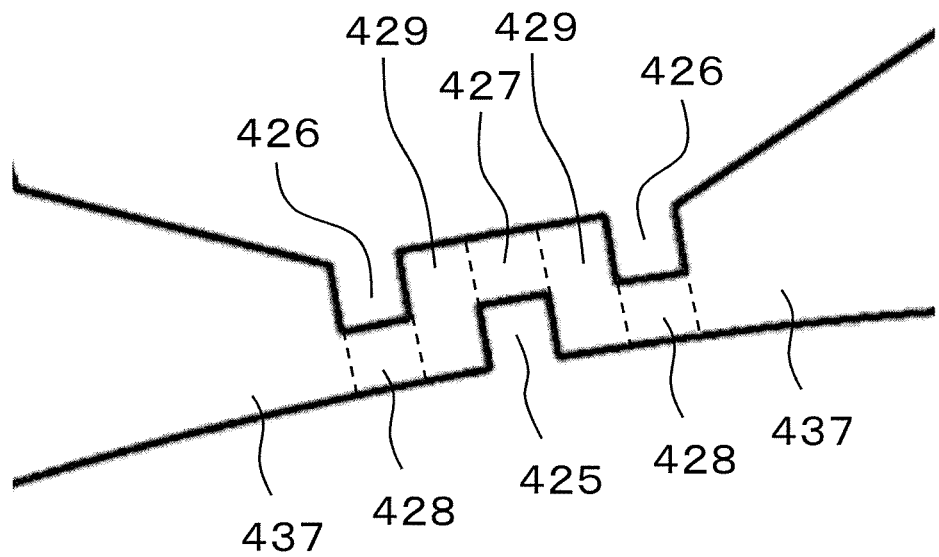
FIG. 5 is an enlarged view for illustrating a connecting portion of FIG. 4.

FIG. 5 is an enlarged view for illustrating the connecting portion 424 of FIG. 4. The connecting portion 424 includes a slot portion-side thin connecting portion 427 formed at a position closer to the slot portion 421, specifically, a position on a radially outer side, with respect to a position at which the cutout portion 425 is formed. The slot projecting portions 426 project toward the magnetic air gap portion 416 relative to a position at which the slot portion-side thin connecting portion 427 projects most toward the slot portion 421 within a range of the connecting portion 424 except for a circumferential range in which the cutout portion 425 is formed. In other words, the slot projecting portions 426 are formed in portions of the connecting portions 424, which are shifted in the circumferential direction from the portion of the connecting portion 424 in which the slot portion-side thin connecting portion 427 is formed. An innermost diameter of the slot projecting portions 426 with the axial center of the rotary shaft 412 being the center is smaller than an outermost diameter of the slot portion-side thin connecting portion 427 with the axial center of the rotary shaft 412 being the center.

Further, the connecting portion 424 has magnetic air gap portion-side thin connecting portions 428 provided at positions on the side closer to the magnetic air gap portion 416, specifically, on a radially inner side, with respect to the positions at which the slot projecting portions 426 are formed, and radial thin connecting portions 429, which connect the slot portion-side thin connecting portion 427 and the magnetic air gap portion-side thin connecting portions 428 to each other. The slot projecting portions 426 are arranged on both of circumferential sides of the cutout portion 425. The cutout portion 425 and the slot projecting portions 426 are arranged so as to be mirror-symmetric with respect to a center line C passing through a center of the tooth portion 420 of the stator 405. In other words, the cutout portion 425 and the slot projecting portions 426 are arranged so as to be mirror-symmetric with respect to a plane that passes through the center of the tooth portion 420 and contains the axial center of the stator 405.

The connecting portion 424 further includes flange portions 437 each projecting circumferentially outward from the distal end of the tooth portion 420 with a radial width thereof being gradually decreased. The flange portion 437 connects the tooth portion 420 and the magnetic air gap portion-side thin connecting portion 428 to each other. A radial width of the slot portion-side thin connecting portion 437 and a radial width of the magnetic air gap portion-side thin connecting portion 428 are smaller than a minimum radial width of the flange portion 427, and are minimum in the connecting portion 424.

As illustrated in FIG. 4, when current is supplied to the armature winding 404, a magnetic flux extending in the radial direction is generated in each of the tooth portions 420. The magnetic flux branches into a main magnetic flux D flowing toward the magnetic air gap portion 416 and leakage magnetic fluxes E flowing toward the tooth portions 420 adjacent thereto in the distal end of the tooth portion 420. A magnetic flux is generated in the air gap portion between the stator 405 and the rotor 415 by the main magnetic flux D passing through a total of the eighteen tooth portions 420 to generate the torque in the rotary electric machine 402. Meanwhile, the leakage magnetic fluxes E do not generate a magnetic flux in the air gap portion between the stator 405 and the rotor 415 and therefore do not contribute to the torque generated in the rotary electric machine 402.

When the rotary electric machine 402, in which the distal ends of the adjacent tooth portions 420 are connected to each other with use of the connecting portions 424, is driven, a magnetic resistance is reduced in a path through which the magnetic flux passes in the connecting portions 424 to increase the leakage magnetic fluxes E because the adjacent tooth portions 420 are connected to each other with use of the magnetic bodies. As a result, there arises a problem in that the amount of main magnetic flux D relatively decreases to reduce the average torque output from the rotary electric machine 402.

Further, the connecting portions 424 are formed of the magnetic material. Therefore, when a position of the rotor 415 changes, magnetic saturation occurs in the connecting portions 424 due to the magnetic flux generated by the rotor 415 and the armature coils 423 to change the magnetic resistance in the connecting portions 424. In this manner, the leakage magnetic fluxes E are varied to vary a sum of the amounts of main magnetic flux generated in the total of eighteen tooth portions 420. As a result, the torque pulsation is increased in the rotary electric machine 402. In short, the rotary electric machine 402, in which the distal ends of the tooth portions 420 are connected to each other with use of the connecting portions 424, has a problem of increased torque pulsation.

Figure 6:
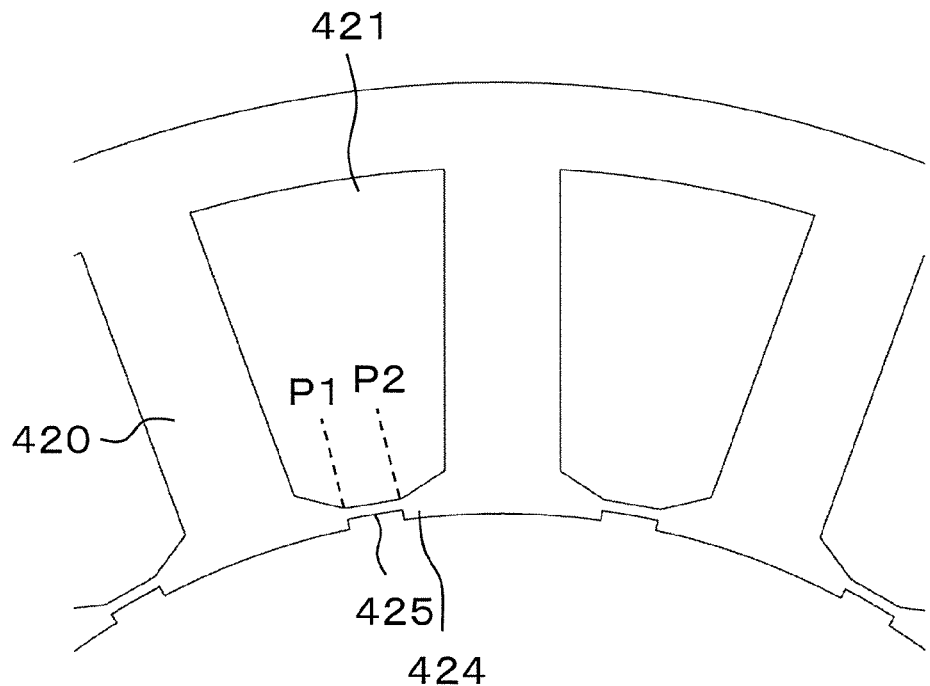
FIG. 6 is an enlarged view for illustrating a main part of a stator core of a related-art example.

Next, effects of the first embodiment are described in comparison to those of a related-art example. FIG. 6 is an enlarged view for illustrating a main part of a stator core of the related-art example. In the related-art example, the cutout portion 425 projecting toward the slot portion 421 from end surfaces of the tooth portions 420 and end surfaces of the connecting portions 424 that are located on the side closer to the magnetic air gap portion 416 is formed in the connecting portion 424. In the related-art example, the slot projecting portions 426 are not formed in the connecting portion 424. In FIG. 6, only a structure between P1 and P2 of the connecting portion 424 is different from that of the first embodiment, and the remaining structure is the same as that of the first embodiment.

Figure 7:
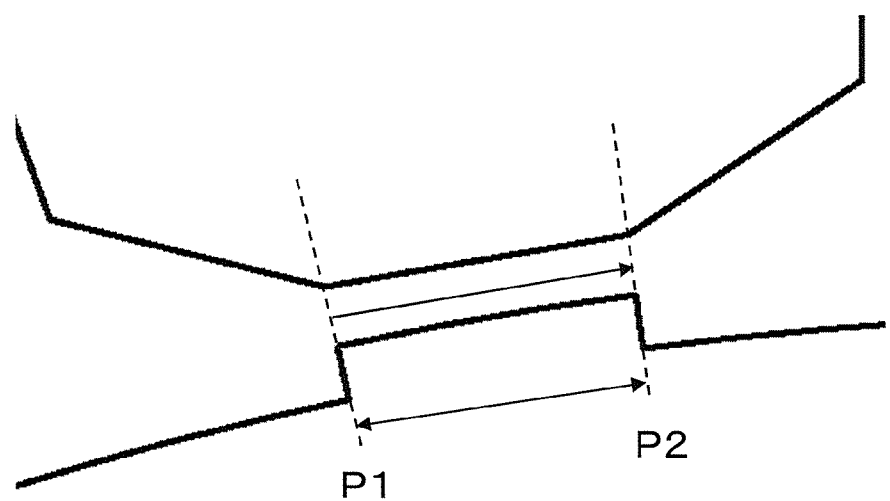
FIG. 7 is a view for illustrating a path for a leakage magnetic flux passing through a connecting portion of FIG. 6.
Figure 8:
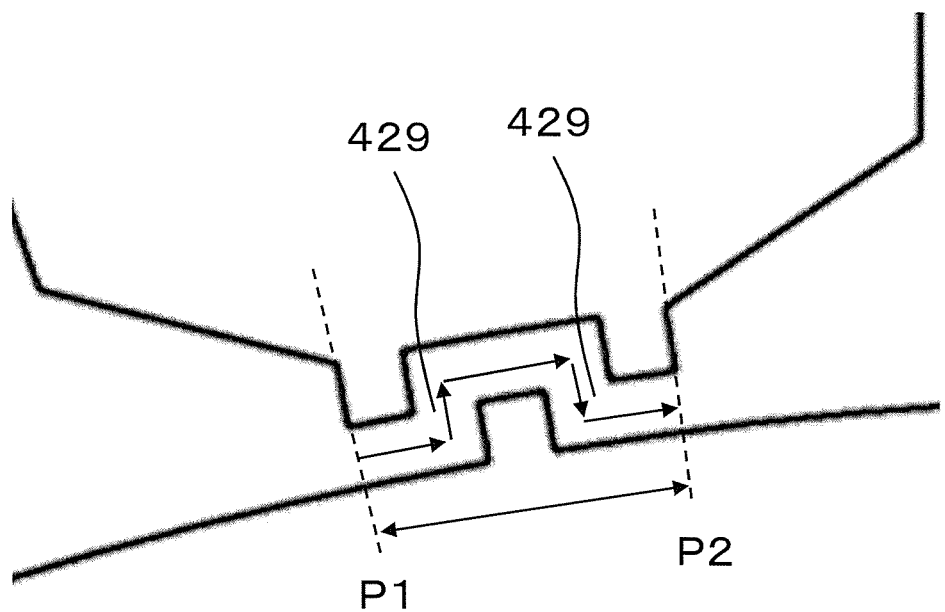
FIG. 8 is a view for illustrating a path for a leakage magnetic flux passing through the connecting portion of FIG. 5.

FIG. 7 is a view for illustrating a path for the leakage magnetic flux E passing through the connecting portion 424 of FIG. 6, whereas FIG. 8 is a view for illustrating a path for the leakage magnetic flux E passing through the connecting portion 424 of FIG. 5. In the first embodiment, the path for the leakage magnetic flux E passing between P1 and P2 contains a path passing through the radial thin connecting portions 429. Therefore, the path for the leakage magnetic flux E passing through the connecting portion 424 is longer than that in the related-art example. This is because the connecting portion 424 has the radial thin connecting portions 429, which connect the slot portion-side thin connecting portion 427 and the magnetic air gap portion-side thin connecting portions 428 to each other, in the first embodiment.

Figure 9:
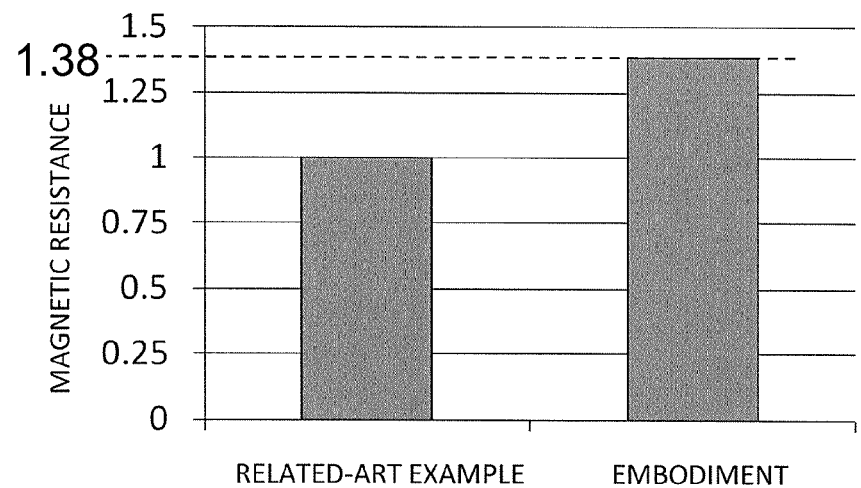
FIG. 9 is a graph for showing a magnetic resistance between P1 and P2 in each of the first embodiment and the related-art example under equivalent driving conditions.

Next, the magnetic resistance between P1 and P2 in each of the connecting portion 424 of FIG. 7 and the connecting portion 424 of FIG. 8 is described. FIG. 9 is a graph for showing the magnetic resistances between P1 and P2 in the first embodiment and the related-art example under equivalent driving conditions. Because of the longer path for the leakage flux E passing through the connecting portion 424 than that of the related-art example, the magnetic resistance between P1 and P2 in the first embodiment is increased to be 1.38 times as large as that of the related-art example. Therefore, in the connecting portion 424 in the first embodiment, with the cutout portion 425 and the slot projecting portions 426 being formed in the connecting portion 424, the connecting portion 424 has the radial thin connecting portions 429, which connect the slot portion-side thin connecting portion 427 and the magnetic air gap portion-side thin connecting portions 428 to each other, with the result that the effect to increase the magnetic resistance in the connecting portion 424 is obtained. Although the structures of the first embodiment and the related-art example that are different from each other only in the structure between P1 and P2 in the connecting portion 424 have been described in this example, the effect to increase the magnetic resistance in the connecting portion 424 is obtained even with other structures as long as the connecting portion 424 has the radial thin connecting portions 429.

Figure 10:
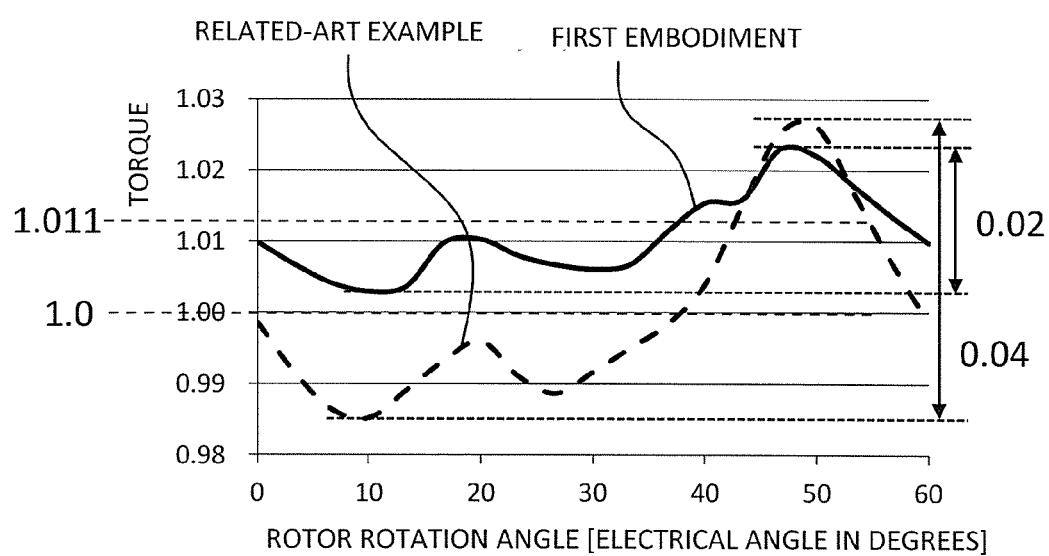
FIG. 10 is a graph for showing torque waveforms obtained when the rotary electric machine of the first embodiment and a rotary electric machine of the related-art example are driven under the same conditions.

Next, torque waveforms obtained when the rotary electric machine of the first embodiment and the rotary electric machine of the related-art example are driven under the same conditions are described. FIG. 10 is a graph for showing the torque waveforms obtained when the rotary electric machine of the first embodiment and the rotary electric machine of the related-art example are driven under the same conditions. In FIG. 10, values normalized with an average torque output from the rotary electric machine of the related-art example are shown. In the rotary electric machine of the first embodiment, the average torque is increased by about 1.1% from 1.0 to 1.011, and the torque pulsation is reduced by about 50% from 0.04 to 0.02 in comparison to the rotary electric machine of the related-art example. The reason for the increase in average torque is that, because of the increase in magnetic resistance in the connecting portions 424, the leakage magnetic flux is reduced to increase the amount of main magnetic flux. The reason for the reduction in torque pulsation is that, because of the increase in magnetic resistance in the connecting portions 424, the amount of leakage magnetic flux is reduced relative to the main magnetic flux to reduce the effects on the variation in main magnetic flux exhibited when the leakage magnetic flux is varied along with the rotation of the rotor 415. Therefore, in the first embodiment, because of the increase in magnetic resistance in the connecting portions 424, the average torque of the rotary electric machine can be increased, while the torque pulsation of the rotary electric machine can be reduced.

When the torque is generated in the rotary electric machine 402, the main magnetic flux and the leakage magnetic flux passing through the distal end of the tooth portion 420 flow in a direction of being attracted to the rotor 415 or of being repelled therefrom. Therefore, each of the main magnetic flux and the leakage magnetic flux contains a circumferential component. In the first embodiment, the rotor 415 of the rotary electric machine 402 rotates clockwise or counterclockwise on the drawing sheet of FIG. 3. The currents of 3n phases are supplied to the armature winding 404. Therefore, when the rotating direction is different, the direction in which the main magnetic flux and the leakage magnetic flux are attracted to or repelled from the rotor 415 is reversed, with the result that the circumferential component of each of the main magnetic flux and the leakage magnetic flux is reversed.

In the structure in which the connecting portions 424 are formed between the adjacent tooth portions 420, when the circumferential component of each of the main magnetic flux and the leakage magnetic flux is reversed, the leakage magnetic flux passing through the connecting portion 424 changes due to the effects of the shape of the connecting portion 424 and the difference in symmetry of a portion of the connecting portion 424 in which the magnetic saturation occurs with respect to the tooth portion 420. As a result, there is a fear of difference in amount of main magnetic flux depending on the direction of rotation of the rotary electric machine 402. As described above, when the amount of main magnetic flux differs depending on the direction of rotation of the rotary electric machine 402, the average torque and the torque pulsation of the rotary electric machine 402 are varied depending on the direction of rotation. Therefore, there is a problem in that, even when the magnetic resistance is increased to increase the average torque and reduce the torque pulsation for one of the directions of rotation, the effects cannot be obtained for another of the directions of rotation.

As described above, in the rotary electric machine according to the first embodiment of the present invention, the slot projecting portions 426 are arranged on both of the circumferential sides of the cutout portion 425 in the connecting portion 424. Therefore, even when the direction of rotation is reversed to reverse the circumferential component of each of the main magnetic flux and the leakage magnetic flux passing through the distal end of the tooth portion 420, the connecting portion 424 has an even number of, in this example, two radial thin connecting portions 429 because the slot projecting portions 426 are arranged on both of the circumferential sides of the cutout portion 425. Accordingly, the circumferential component of each of the main magnetic flux and the leakage magnetic flux before the reverse of the direction of rotation of the rotary electric machine 402 and that after the reverse of the direction of rotation become symmetric with respect to the slot portion-side thin connecting portion 427. Therefore, the effects of asymmetry of the magnetic flux depending on the direction of rotation due to the shape of the connecting portion 424 and the difference in symmetry of the portion in which the magnetic saturation occurs with respect to the tooth portion 420 can be mitigated. Thus, the leakage magnetic flux can be made approximately equal for each direction of rotation. Therefore, even when the direction of rotation of the rotary electric machine 402 is changed, the amount of main magnetic flux can be made approximately the same. Thus, the variation in average torque and the variation in torque pulsation generated depending on the direction of rotation of the rotary electric machine 402 can be reduced. Further, even after the direction of rotation of the rotary electric machine 402 is changed, the effect to increase the average torque and the effect to reduce the torque pulsation described above can be exhibited.

Further, in the rotary electric machine described above, the cutout portion 425 and the slot projecting portions 426 are arranged mirror-symmetric with respect to the center line of each of the tooth portions 420 of the stator 405. Therefore, the leakage magnetic flux can be made further equal after the direction of rotation of the rotary electric machine 402 is changed. Thus, the variation in average torque and the variation in torque pulsation generated depending on the direction of rotation can be further reduced. Although it has been described in the first embodiment that the cutout portion 425 and the slot projecting portions 426 are arranged so as to be mirror-symmetric with respect to the center line of each of all the tooth portions 420 of the stator 405, equivalent effects are obtained even when the cutout portion 425 and the slot projecting portions 426 are arranged so as to be mirror-symmetric for at least one of the tooth portions 420.

Further, in the rotary electric machine described above, the position of the cutout portion 425 and the positions of the slot projecting portions 426 formed in the connecting portion 424 are rotationally symmetric as illustrated in FIG. 4. Further, the connecting portion 424 serves as a minimum unit of the rotational symmetry. In this manner, when the rotor 415 is rotated, the amount of leakage magnetic flux generated in the connecting portions 424 becomes equal. Therefore, the variation in main magnetic flux can be reduced. As a result, the torque pulsation can be further reduced. Although it has been described in the first embodiment that the cutout portion 425 and the slot projecting portions 426 of each of all the connecting portions 424 of the stator 405 are rotationally symmetric, equivalent effects are obtained even when the cutout portion 425 and the slot projecting portions 426 are rotationally symmetric for at least one of the connecting portions 424.

Although it has been described in the first embodiment that the rotary electric machine 402 includes the rotor 415 having fourteen poles and the stator 405 having eighteen slots, the same effects are obtained even with the rotor 415 having the number of poles being other than fourteen and the stator having the number of slots being other than eighteen.

Further, although it has been described above in the first embodiment that the permanent magnets 414 are arranged in the permanent magnet embedding portions 417 of the rotor 415, the arrangement of the permanent magnets is not limited thereto. Equivalent effects are obtained even when the permanent magnets 414 are bonded onto a surface of the rotor 415.

Further, equivalent effects are obtained even with a reluctance motor or an induction machine in which a torque is generated by the main magnetic flux supplied from the stator 405. Further, equivalent effects are obtained even with a wound-field type rotary electric machine.

Figure 11:
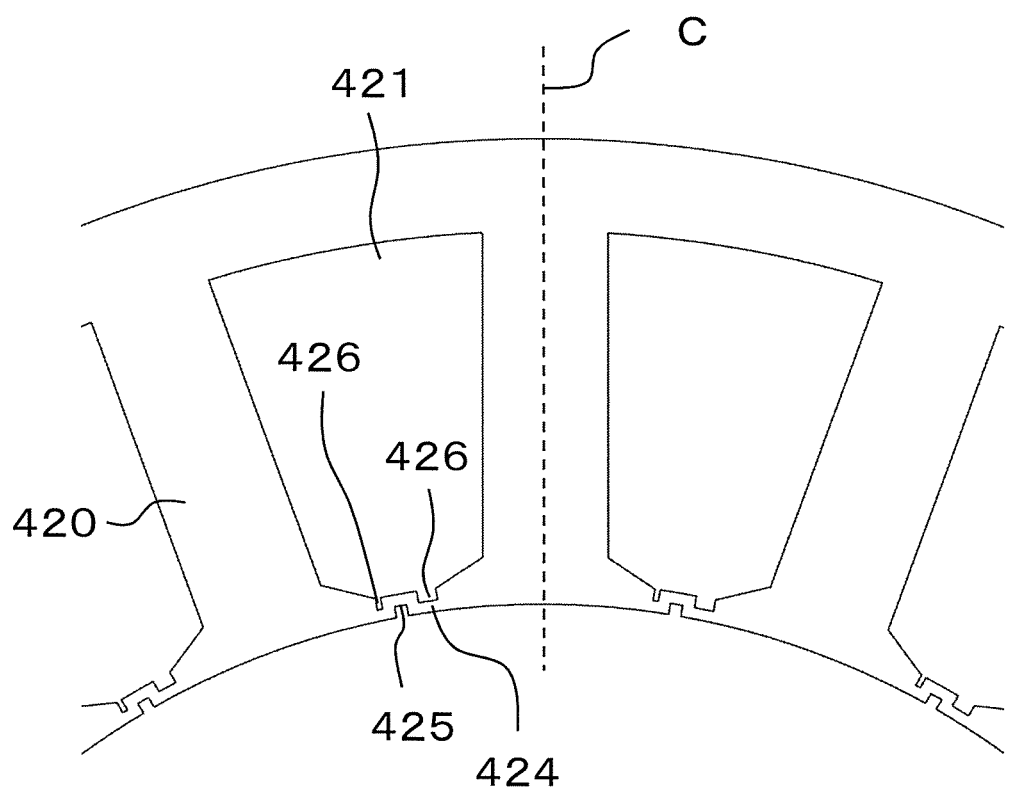
FIG. 11 is a view for illustrating a modification example of the connecting portions of the rotary electric machine according to the first embodiment.

Further, although it has been described above in the first embodiment that the cutout portion 425 and the slot projecting portions 426 are arranged so as to be mirror-symmetric with respect to the center line of each of the tooth portions 420 of the stator 405, the arrangement of the cutout portion 425 and the slot projecting portions 426 is not limited thereto. Equivalent effects are obtained as long as the connecting portion 424 is formed so that the slot projecting portions 426 are arranged on both of the circumferential sides of the cutout portion 425. FIG. 11 is a view for illustrating a modification example of the connecting portion in the rotary electric machine according to the first embodiment. Even when the cutout portion 425 and the slot projecting portions 426 are not mirror-symmetric with respect to the center line C of each of the tooth portions 420 of the stator 405 as illustrated in FIG. 11, the same effects as those of the first embodiment can be obtained.

Further, in the electric power steering device, the oscillation generated in the rotary electric machine 402 is transmitted to the driver through intermediation of a gear. Therefore, in order to provide satisfactory steering feeling, it is desired that the assist torque be large and the oscillation be small. Further, it is desired that noise generated when the rotary electric machine operates be small. In the electric power steering device to which the rotary electric machine described in the first embodiment is applied, the rigidity of the rotary electric machine is increased while the torque is increased. As a result, reduction in oscillation, reduction in noise, and increase in torque can be all achieved. In the manner described above, the reduction in oscillation, the reduction in noise, and the increase in torque can be achieved for the electric power steering device.

Further, the electric power steering device in which the rotary electric machine is arranged so as to be oriented in parallel to the direction of movement of the rack shaft, which is the direction indicated by the arrowed line A, is a system suitable for large-size vehicles. However, the rotary electric machine is required to output increased power, and the electric power steering device has a problem in that the oscillation and the noise due to the rotary electric machine also increase with the increase in power output. When the rotary electric machine described in the first embodiment is applied, the above-mentioned problem is solved. Thus, the electric power steering device can be applied even to large-size vehicles, and power consumption can be reduced.

Further, the rack shaft is required to be moved, and therefore the rotary electric machine to be mounted in the electric power steering device is rotated clockwise or counterclockwise on the drawing sheet of FIG. 3. The effect to increase the average torque and the effect to reduce the torque pulsation described above can be exhibited in the first embodiment even after the direction of rotation is changed. Therefore, further reduction in oscillation, further reduction in noise, and further increase in torque can be achieved for the electric power steering device.

Second Embodiment

Figure 12:
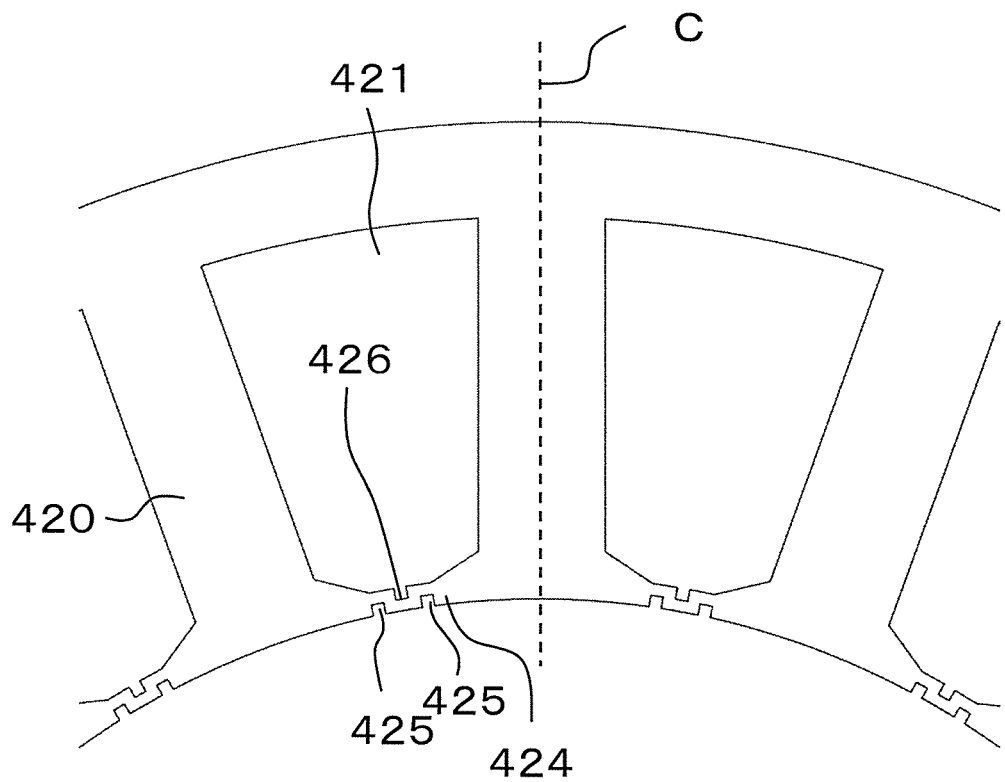
FIG. 12 is a view for illustrating connecting portions and tooth portions of a rotary electric machine according to a second embodiment of the present invention.

FIG. 12 is a view for illustrating connecting portions and tooth portions of a rotary electric machine according to a second embodiment of the present invention. The second embodiment is different from the first embodiment only in the connecting portions, and the remaining configuration thereof is the same as that of the first embodiment.

End surfaces of the tooth portions 420 and end surfaces of the connecting portions 424 that are located on a side closer to the magnetic air gap portion 416 are formed into a shape extending substantially along a cylinder having the rotary shaft 412 as the center. In the connecting portion 424, two cutout portions 425 each having an approximately quadrangular shape and projecting from the end surface toward the slot portion 421 are formed. In other words, the two cutout portions 425 are formed in a portion of the connecting portion 424 that is located on the side closer to the magnetic air gap portion 416. Each of the cutout portions 425 has a given width in the circumferential direction. Further, one slot projecting portion 426 having an approximately quadrangular shape and projecting from the slot portion 421 toward the magnetic air gap portion 416 is formed in the connecting portion 424. In other words, one slot projecting portion 426 is formed in a portion of the connecting portion 424 that is located on the side closer to the slot portion 421.

Figure 13:
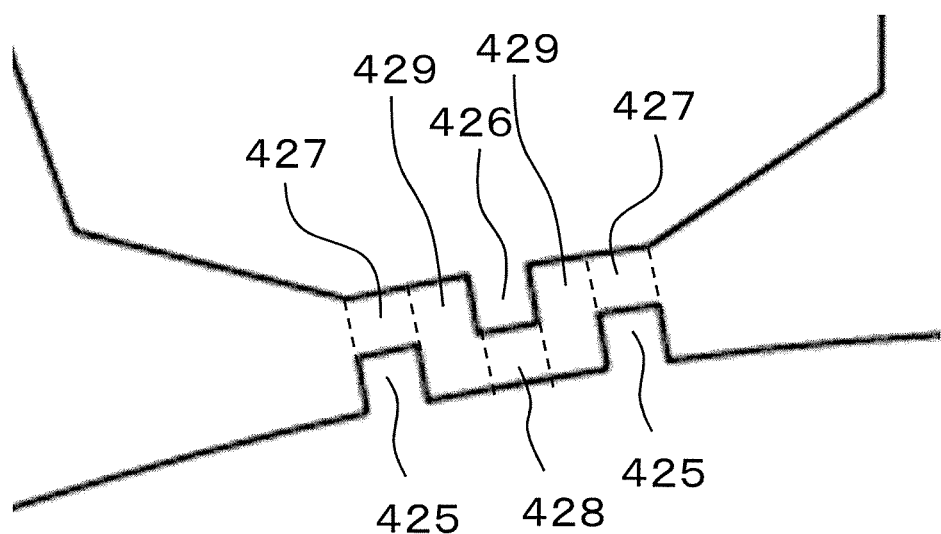
FIG. 13 is an enlarged view for illustrating the connecting portion of FIG. 12.

FIG. 13 is an enlarged view for illustrating the connecting portion 424 of FIG. 12. In the second embodiment, as in the first embodiment, the slot projecting portion 426 projects toward the magnetic air gap portion 416 relative to positions at which the slot portion-side thin connecting portions 427 project most toward the slot portion 421 within a range of the connecting portion 424 except for a circumferential range in which the cutout portions 425 are formed. Further, the connecting portion 424 includes the magnetic air gap portion-side thin connecting portion 428, which is located on a side closer to the magnetic air gap portion 416 than the position at which the slot projecting portion 426 is formed, that is, on a radially inner side of the position at which the slot projecting portion 426 is formed. The connecting portion 424 further includes the radial thin connecting portions 429, which connect the slot portion-side thin connecting portions 427 and the magnetic air gap portion-side thin connecting portion 428 to each other. The cutout portions 425 are arranged on both of the circumferential sides of the slot projecting portion 426. The cutout portions 425 and the slot projecting portion 426 are arranged mirror-symmetric with respect to the center line C of each of the tooth portions 420 of the stator 405. In other words, the cutout portions 425 and the slot projecting portion 426 are arranged mirror-symmetric with respect to the plane that passes through the center of the tooth portion 420 and contains the axial center of the stator 405.

As described above, according to the rotary electric machine of the second embodiment of the present invention, similarly to the first embodiment, a path passing through the radial thin connecting portions 429 is contained as the path for the leakage magnetic flux. Therefore, the path for the leakage magnetic flux passing through the connecting portion 424 is increased in length. As a result, the magnetic resistance in the connecting portion 424 is increased to reduce the leakage magnetic flux and increase the amount of main magnetic flux. As a result, the average torque is increased. Further, the magnetic resistance in the connecting portion 424 is increased. Therefore, the amount of leakage magnetic flux can be reduced relative to the main magnetic flux. Accordingly, the effect on the variation in main magnetic flux exhibited when the leakage magnetic flux is varied along with the rotation of the rotor 415 can be reduced. In this manner, even in the second embodiment, the magnetic resistance in the connecting portion 424 is increased. Thus, the average torque can be increased, while the torque pulsation can be reduced.

Further, in the rotary electric machine described above, the cutout portions 425 are arranged on both of the circumferential sides of the slot projecting portion 426. In this manner, even when the direction of rotation of the rotary electric machine 402 is changed to reverse the circumferential component of each of the main magnetic flux and the leakage magnetic flux passing through the distal end of the tooth portion 420 as in the first embodiment, the effect of the shape of the connecting portion 424 and the effect of the difference in symmetry of the portion of the connecting portion 424 in which the magnetic saturation occurs with respect to the tooth portion 420 can be mitigated. Consequently, the effect to make the leakage magnetic flux approximately equal can be obtained. Therefore, even when the direction of rotation of the rotary electric machine 402 is changed, the amount of main magnetic flux can be made approximately the same. Thus, the variation in average torque and the variation in torque pulsation generated depending on the direction of rotation can be reduced. Further, the effect to increase the average torque and the effect to reduce the torque pulsation described above can be exhibited even after the direction of rotation of the rotary electric machine 402 is changed.

Further, in the rotary electric machine described above, as in the first embodiment, the cutout portions 425 and the slot projecting portion 426 are arranged so as to be mirror-symmetric with respect to the center line C of each of the tooth portions 420 of the stator 405. Therefore, the leakage magnetic flux after the direction of rotation of the rotary electric machine 402 is changed can be made further equal. Consequently, the variation in average torque and the variation in torque pulsation, which are generated due to the change of the direction of rotation, can be further reduced.

Third Embodiment

Figure 14:
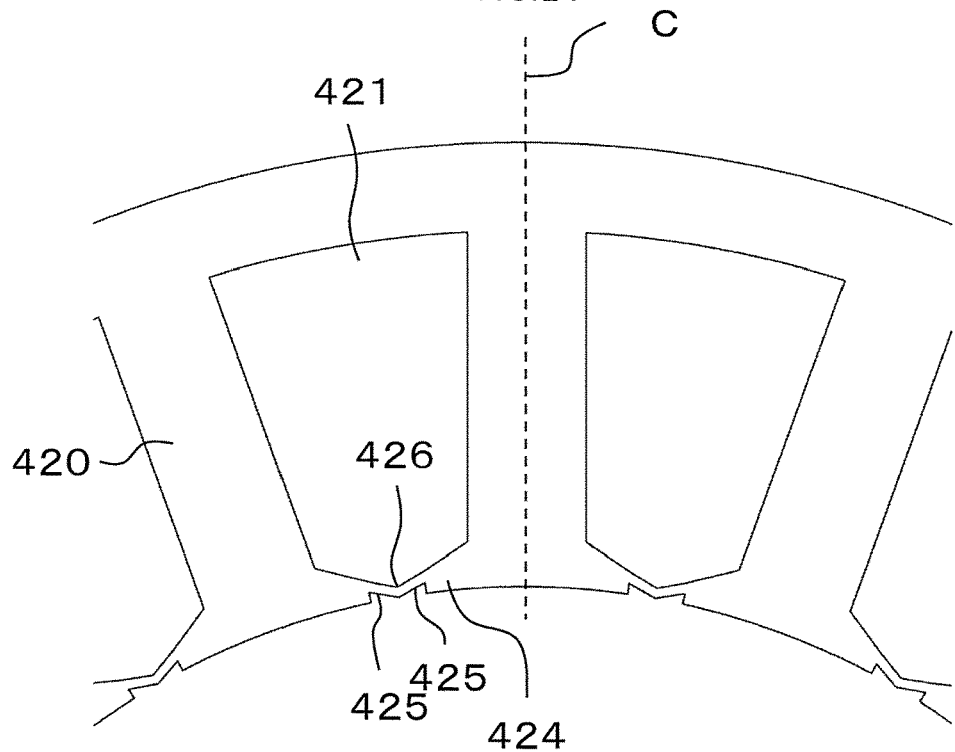
FIG. 14 is a view for illustrating connecting portions and tooth portions of a rotary electric machine according to a third embodiment of the present invention.

FIG. 14 is a view for illustrating connecting portions and tooth portions of a rotary electric machine according to a third embodiment of the present invention. The third embodiment is different from the second embodiment only in that a shape of each of the cutout portions 425 and the slot projecting portion 426 is approximately triangular, and the remaining configuration thereof is the same as that of the second embodiment.

Figure 15:
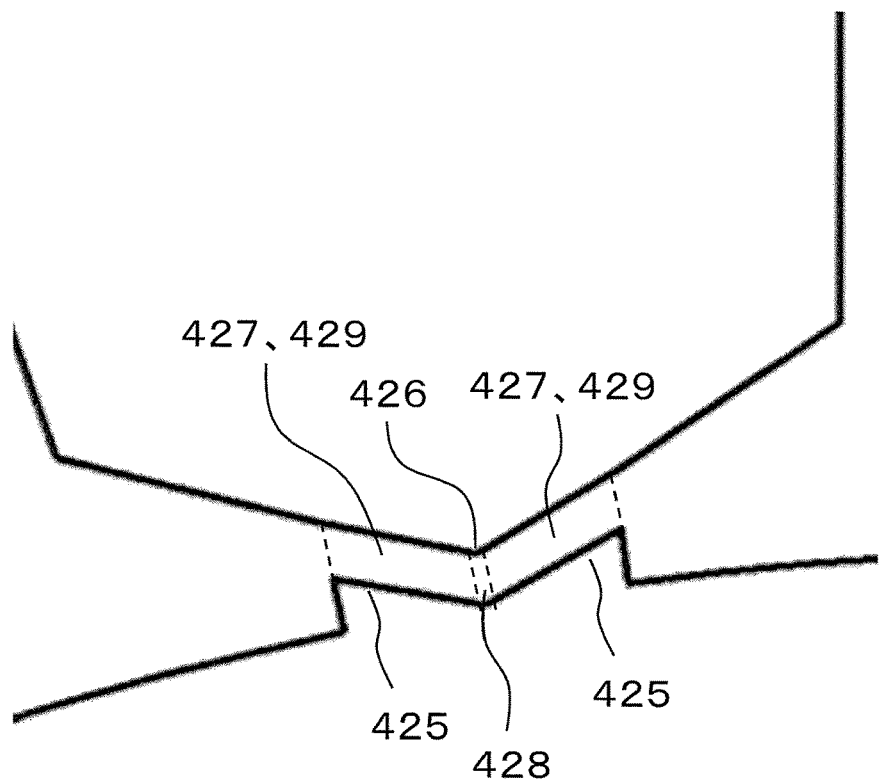
FIG. 15 is an enlarged view for illustrating the connecting portion of FIG. 14.

FIG. 15 is an enlarged view for illustrating the connecting portion 424 of FIG. 14. In the third embodiment, as in the second embodiment, the slot projecting portion 426 projecting toward the magnetic air gap portion 416 with respect to the slot portion-side thin connecting portions 427, which are portions located on the side closer to the slot portion 421 with respect to the cutout portions 425 in the connecting portion 424, is formed at a position excluding circumferential ranges of the connecting portion 424 in which the cutout portions 425 are formed. Even in the third embodiment, an innermost diameter of the slot projecting portion 426 with the axial center of the rotary shaft 412 being the center is smaller than an outermost diameter of the slot portion-side thin connecting portions 427 with the axial center of the rotary shaft 412 being the center.

Further, the connecting portion 424 has the magnetic air gap portion-side thin connecting portion 428 provided at a position on the side closer to the magnetic air gap portion 416, specifically, on the radially inner side, with respect to the slot projecting portion 426, and the radial thin connecting portions 429, which connect the slot portion-side thin connecting portions 427 and the magnetic air gap portion-side thin connecting portion 428 to each other. In the third embodiment, however, the slot portion-side thin connecting portions 427 and the radial thin connecting portions 429 fall within approximately the same range. The connecting portion 424 has the cutout portions 425 arranged on both of the circumferential sides of the slot projecting portion 426. The cutout portions 425 or the slot projecting portion 426 are arranged so as to be mirror-symmetric with respect to the center line of each of the tooth portions 420 of the stator 405.

As described above, according to the rotary electric machine of the third embodiment of the present invention, the path passing through the radial thin connecting portions 429 is contained as the path for the leakage magnetic flux. Therefore, it is apparent that the same effects as those of the first embodiment are obtained.

Although it has been described above in the third embodiment that the shape of each of the cutout portions 425 and the slot projecting portion 426 is triangular, it is apparent that equivalent effects can be obtained even when each of the cutout portions 425 and the slot projecting portion 426 has another shape, for example, a circular arc-like shape.

Fourth Embodiment

Figure 16:
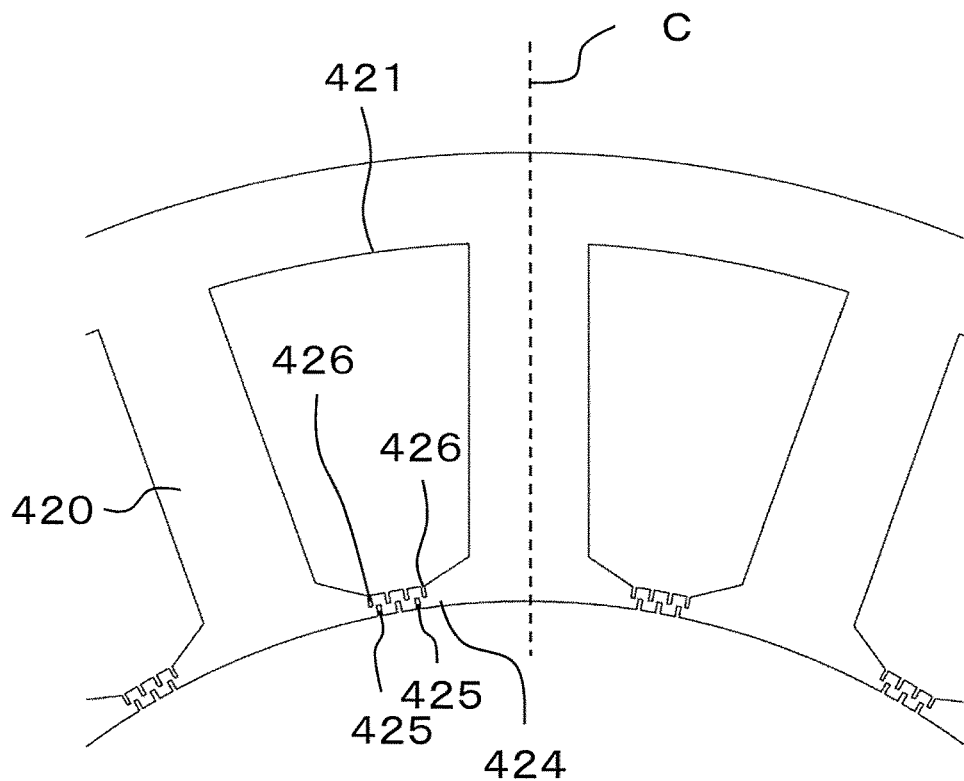
FIG. 16 is a view for illustrating connecting portions and tooth portions of a rotary electric machine according to a fourth embodiment of the present invention.

FIG. 16 is a view for illustrating connecting portions and tooth portions of a rotary electric machine according to a fourth embodiment of the present invention. The fourth embodiment is different from the first embodiment only in the connecting portions, and the remaining configuration thereof is the same as that of the first embodiment.

End surfaces of the tooth portions 420 and end surfaces of the connecting portions 424 that are located on a side closer to the magnetic air gap portion 416 are formed into a shape extending substantially along a cylinder having the rotary shaft 412 as the center. In the connecting portion 424, three cutout portions 425 each having an approximately quadrangular shape and projecting from the end surface toward the slot portion 421 are formed. Each of the cutout portions 425 has a given width in the circumferential direction. Further, four slot projecting portions 426 having an approximately quadrangular shape and projecting from the slot portion 421 toward the magnetic air gap portion 416 are formed in the connecting portion 424.

Figure 17:
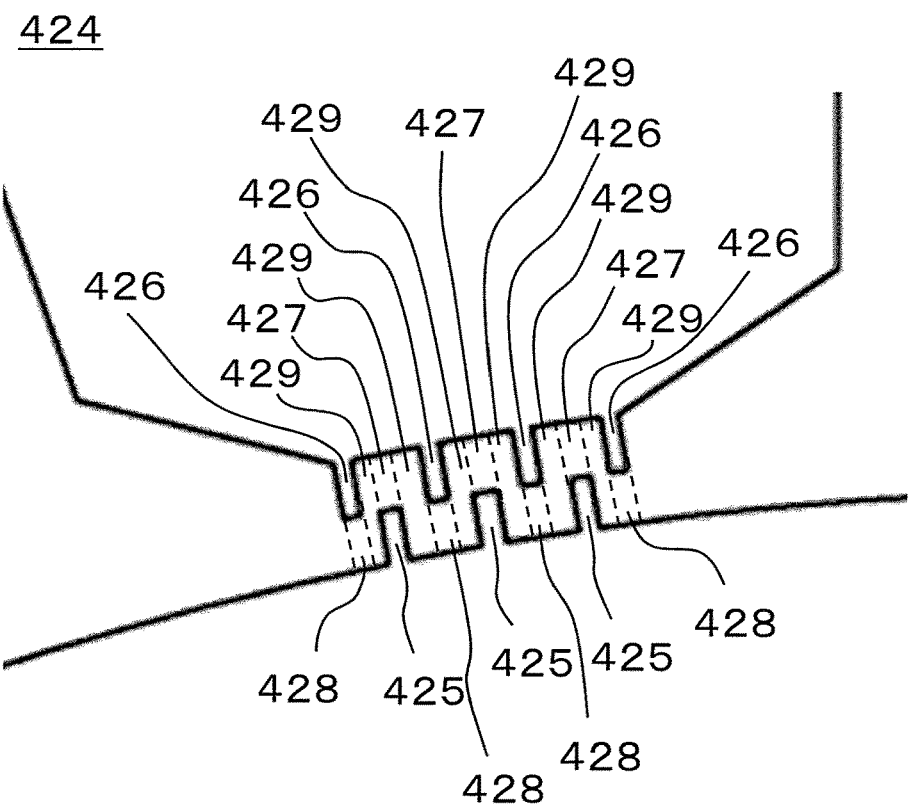
FIG. 17 is an enlarged view for illustrating the connecting portion of FIG. 16.

FIG. 17 is an enlarged view for illustrating the connecting portion 424 of FIG. 16. The connecting portion 424 has three slot portion-side thin portions 427 formed on the side closer to the slot portion 421 with respect to the positions at which the cutout portions 425 are formed. Further, the connecting portion 424 has four magnetic air gap portion-side thin connecting portions 428 formed on the side closer to the magnetic air gap portion 416 with respect to the positions at which the slot projecting portions 426 are formed, and six radial thin connecting portions 429, which connect the slot portion-side thin connecting portions 427 and the magnetic air gap portion-side thin connecting portions 428 to each other.

As described above, according to the rotary electric machine of the fourth embodiment of the present invention, the effects described above can be obtained. Further, the number of radial thin connecting portions 429 is six. Therefore, the magnetic resistance can be increased to increase the average torque and reduce the torque pulsation in comparison to those in the first embodiment.

Further, when the cutout portions 425 and the slot projecting portions 426 are formed in the connecting portion 424, the rigidity of the stator 405 is reduced. In addition, ease of manufacture of the stator 405 is reduced. Therefore, it is desired that the number of cutout portions 425 and the number of slot projecting portions 426 be small. In the rotary electric machine described above, however, the cutout portions 425 and the slot projecting portions 426 are formed alternately in the circumferential direction. The radial thin connecting portions 429 are arranged on both of the circumferential sides of each of the cutout portions 425 and on both of the circumferential sides of each of the slot projecting portions 426 except for those formed on both ends, and hence the effects to increase the average torque and to reduce the torque pulsation are obtained with a reduced number of cutout portions 425 and a reduced number of slot projecting portions 426. Further, because the number of cutout portions 425 and the number of slot projecting portions 426 can be reduced, the rigidity of the stator 405 can be increased, and the ease of manufacture of the stator 405 can be improved.

Further, in the rotary electric machine, the connecting portion 424 has the slot projecting portion 426, the cutout portion 425, and the slot projecting portion 426 arranged in the stated order from the cutout portion 425 formed in a circumferentially central portion as the center to a circumferentially outer side. Therefore, the shape of the connecting portion 424 is symmetric with respect to the tooth portion 420. In this manner, even after the direction of rotation is changed to reverse the circumferential component of each of the main magnetic flux and the leakage magnetic flux passing through the distal end of the tooth portion 420, the effect of the shape of the connecting portion 424 and the effect of the difference in symmetry of the portion of the connecting portion 424 in which the magnetic saturation occurs with respect to the tooth portion 420 can be mitigated. Thus, the effect to make the leakage magnetic flux approximately equal is obtained. As a result, even after the direction of rotation is changed, the amount of main magnetic flux can be made substantially the same. Thus, the effects to reduce the variation in average torque and the variation in torque pulsation, which are generated depending on the direction of rotation, are obtained. Further, even after the direction of rotation is changed, the effect to increase the average torque and the effect to reduce the torque pulsation described above can be exhibited. The effects are obtained because a sum of the number of cutout portions 425 and the number of slot projecting portions 426 is an odd number. When the sum of the number of cutout portions 425 and the number of slot projecting portions 426 is an odd number, equivalent effects are obtained.

Although it has been described above in the fourth embodiment that the number of cutout portions 425 is three and the number of slot projecting portions 426 is four, the number of radial thin connecting portions 429 can be increased by forming two or more cutout portions 425 and two or more slot projecting portions 426. Thus, equivalent effects are obtained. Further, as long as one set of the cutout portions 425 or one set of the slot projecting portions 426 is arranged on each of the circumferential sides of another set, equivalent effects are obtained.

Figure 18:
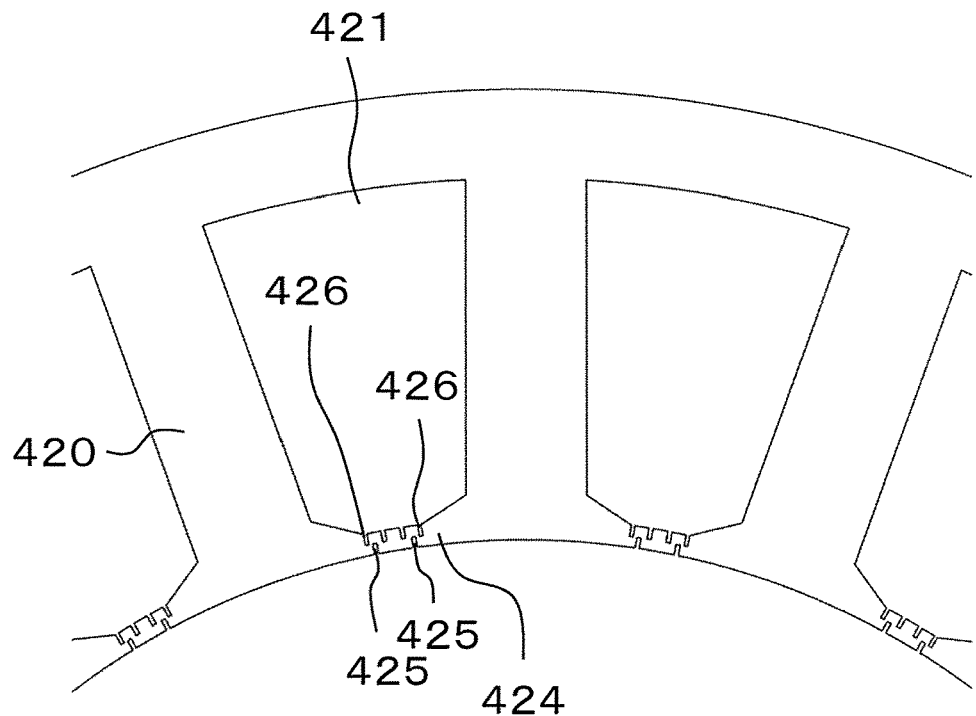
FIG. 18 is a view for illustrating a modification example of the connecting portions in the rotary electric machine according to the fourth embodiment.
Figure 19:
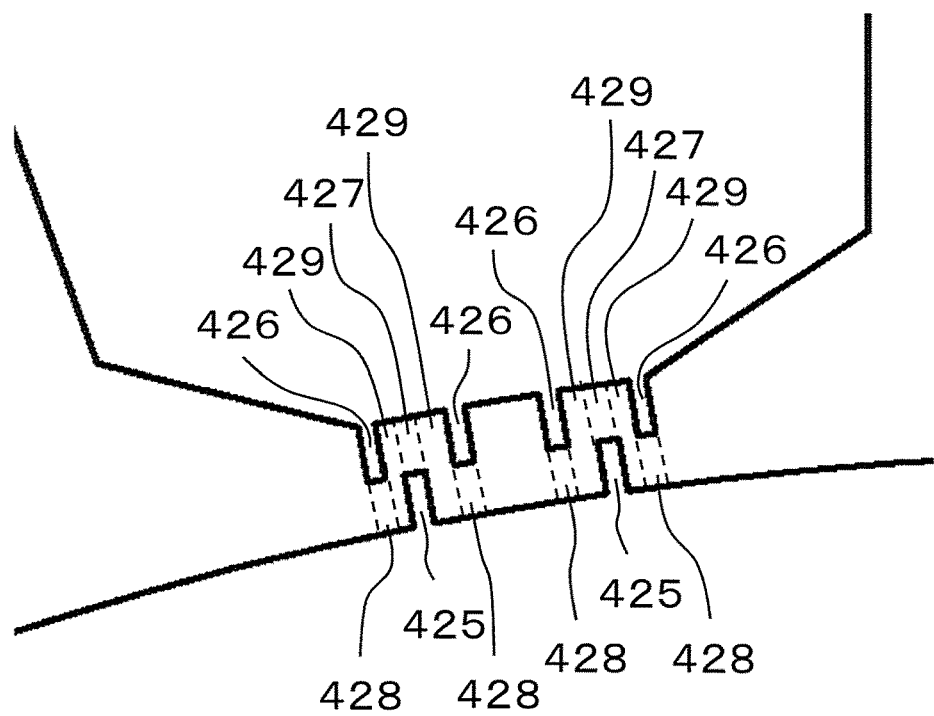
FIG. 19 is an enlarged view for illustrating the connecting portion of FIG. 18.

Further, it has been described above in the fourth embodiment that the cutout portions 425 and the slot projecting portions 426 are arranged alternately in the circumferential direction. As long as one set of the cutout portions 425 or one set of the slot projecting portions 426 is arranged on each of the circumferential sides of another set, however, equivalent effects are obtained even when the cutout portions 425 and the slot projecting portions 426 are not arranged alternately in the circumferential direction. FIG. 18 is a view for illustrating a modification example of the connecting portion in the rotary electric machine according to the fourth embodiment, and FIG. 19 is an enlarged view for illustrating the connecting portion of FIG. 18. In the connecting portion 424, the slot projecting portion 426, the cutout portion 425, the slot projecting portion 426, the slot projecting portion 426, the cutout portion 425, and the slot projecting portion 426 are formed so as to be arranged in the stated order in the circumferential direction. Even in such a case, the effects described in the first embodiment are obtained. Further, in the case described above, the number of radial thin connecting portions 429 is four. Therefore, in comparison to the first embodiment, the magnetic resistance can be increased to increase the average torque and reduce the torque pulsation.

Fifth Embodiment

Figure 20:
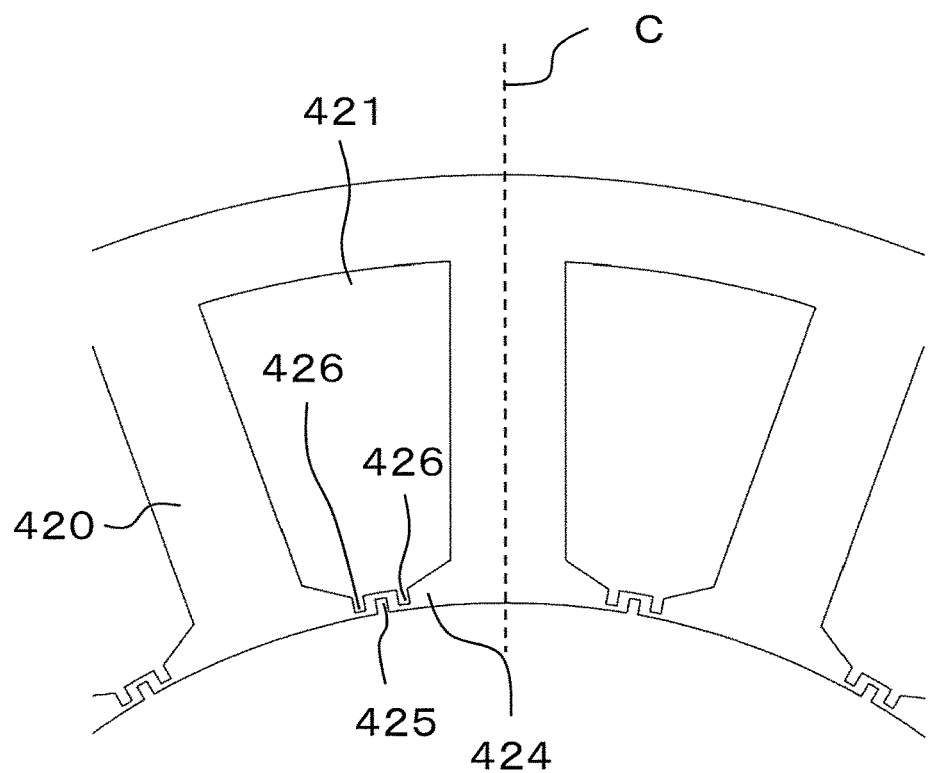
FIG. 20 is a view for illustrating connecting portions and tooth portions of a rotary electric machine according to a fifth embodiment of the present invention.
Figure 21:
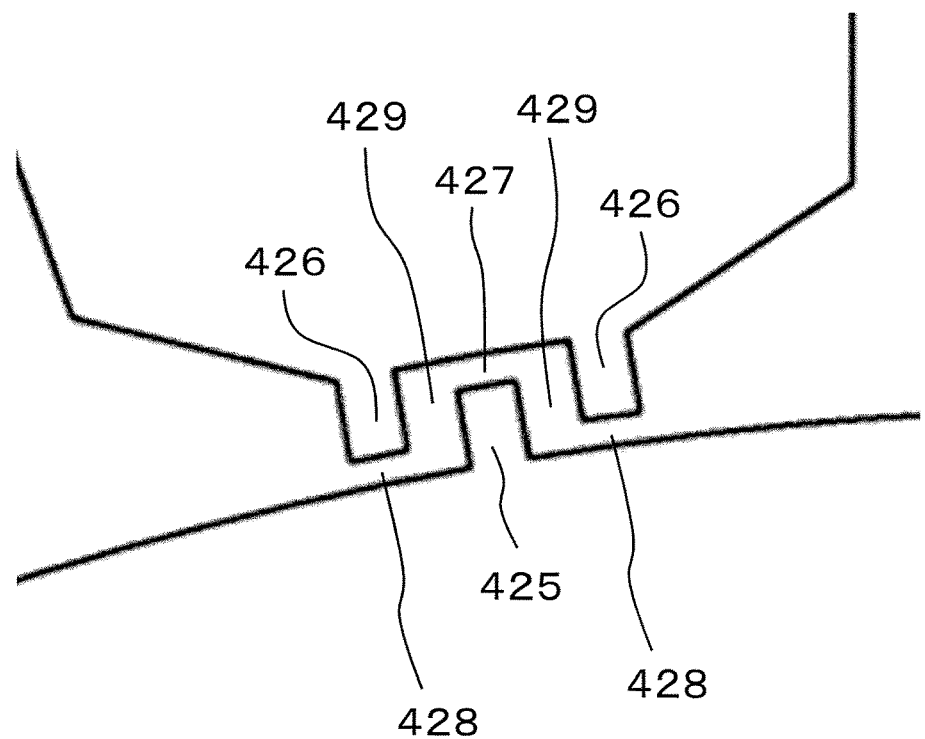
FIG. 21 is an enlarged view for illustrating the connecting portion of FIG. 20.

FIG. 20 is a view for illustrating connecting portions and tooth portions of a rotary electric machine according to a fifth embodiment of the present invention, and FIG. 21 is an enlarged view for illustrating the connecting portion of FIG. 20. The fifth embodiment is different from the first embodiment only in the radial width of the cutout portion and the radial width of the slot projecting portion, and the remaining configuration thereof is the same as that of the first embodiment.

A position at which the slot projecting portion 426 projects most toward the magnetic air gap portion 416 is located closer to the magnetic air gap portion 416 than a position at which the cutout portion 425 projects most toward the slot portion 421, specifically, to the radially outer side. Specifically, an innermost diameter of the slot projecting portion 426 with the axial center of the rotary shaft 412 being the center is smaller than an outermost diameter of the cutout portion 425 with the axial center of the rotary shaft 412 being the center.

As described above, according to the rotary electric machine of the fifth embodiment of the present invention, a radial distance between the slot portion-side thin connecting portion 427, which is located on the side closer to the slot portion 421 with respect to the cutout portion 425, and the magnetic air gap portion-side thin connecting portion 428, which is located on the side closer to the magnetic air gap portion 416 with respect to the slot projecting portion 426 in the connecting portion 424, is increased. Therefore, a radial length of the radial thin connecting portion 429 can be increased. In this manner, the magnetic resistance in the connecting portion 424 can be increased. Consequently, the average torque can be increased, while the torque pulsation can be reduced.

Sixth Embodiment

Figure 22:
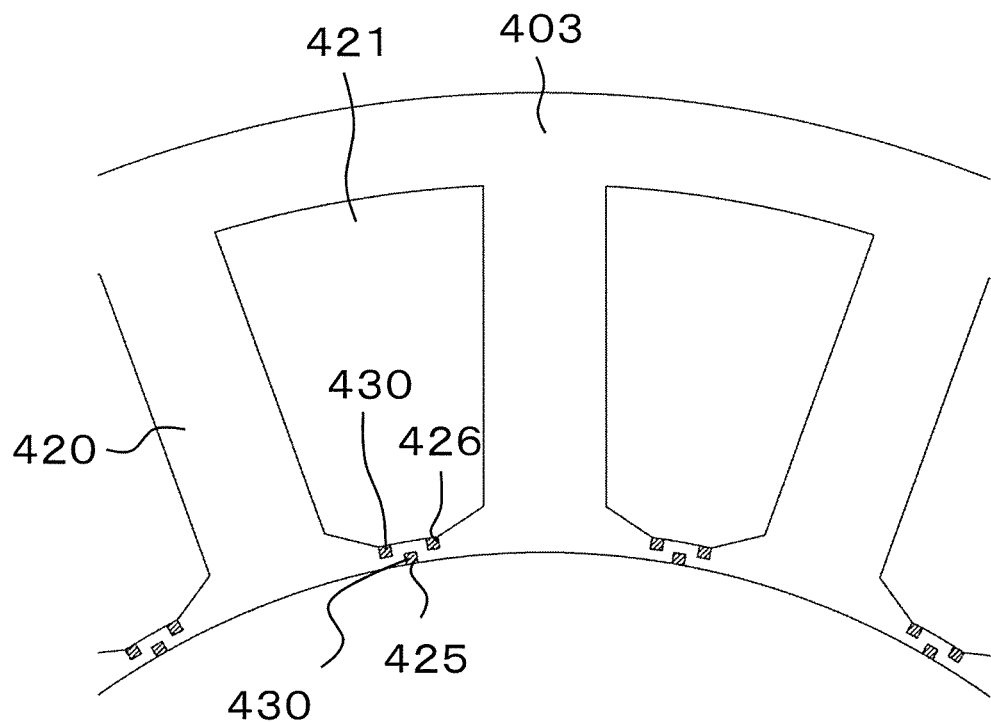
FIG. 22 is a view for illustrating connecting portions and tooth portions according to a sixth embodiment of the present invention.

FIG. 22 is a view for illustrating connecting portions and tooth portions of a rotary electric machine according to a sixth embodiment of the present invention. The sixth embodiment is different from the first embodiment only in that non-magnetic members 430 are inserted into the slot projecting portions 426 and the cutout portion 425, and the remaining configuration thereof is the same as that of the first embodiment. The non-magnetic members 430 are made of resin, a non-magnetic metal, or the like. Examples of the non-magnetic material include SUS and aluminum.

When the cutout portion 425 and the slot projecting portions 426 are formed in the connecting portion 424, the rigidity of the stator 405 is reduced. In the sixth embodiment, the non-magnetic members 430 are inserted into the cutout portion 425 and the slot projecting portions 426 so as to be in contact with inner walls of the cutout portion 425 and inner walls of the slot projecting portions 426.

As described above, according to the rotary electric machine of the sixth embodiment of the present invention, the non-magnetic members 430 are inserted into the cutout portion 425 and the slot projecting portions 426 so as to be in contact with the inner walls of the cutout portion 425 and the inner walls of the slot projecting portions 426. Therefore, the strength of the inner periphery of the stator core 403, which is located on the side closer to the rotor 415, can be increased to increase the rigidity of the stator 405. Consequently, the oscillation of the rotary electric machine 402 can be further reduced, while the above-mentioned effects of the embodiment are obtained.

Although it has been described above in the sixth embodiment that the non-magnetic members 430 are inserted into both of the slot projecting portion 426 and the cutout portion 425, equivalent effects are obtained even when the non-magnetic member 430 is inserted into any one of the slot projecting portion 426 and the cutout portion 425.

Figure 23:
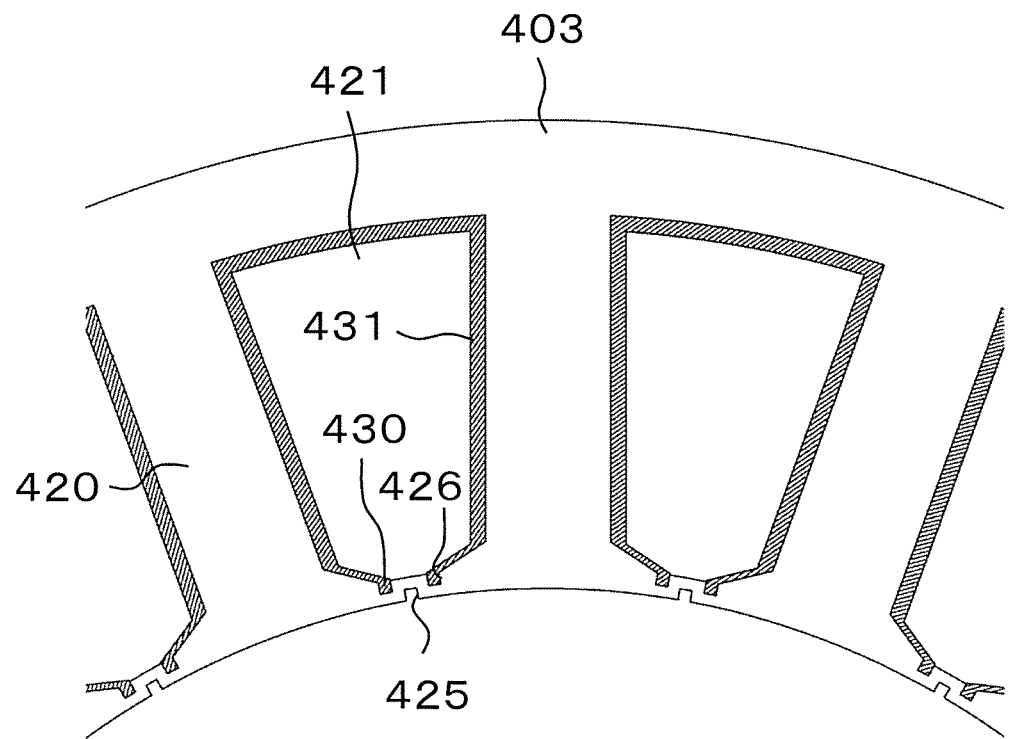
FIG. 23 is a view for illustrating a modification example of non-magnetic members in the rotary electric machine according to the sixth embodiment.

FIG. 23 is a view for illustrating a modification example of the non-magnetic members in the rotary electric machine according to the sixth embodiment. Equivalent effects are obtained even when the non-magnetic member 430 to be inserted into the slot projecting portion 426 is formed integrally with an insulator 431 inserted between the stator core 403 and the armature winding 404. In this case, the insulator 431 is brought into contact with the armature coil 423, and the tooth portions 420 and the core back portion 419 of the stator core 403. Therefore, the strength of the inner periphery of the stator core 403, which is located on the side closer to the rotor 415, can be increased in comparison to that in the first embodiment, and hence the oscillation of the rotary electric machine 402 can be reduced.

Seventh Embodiment

Figure 24:
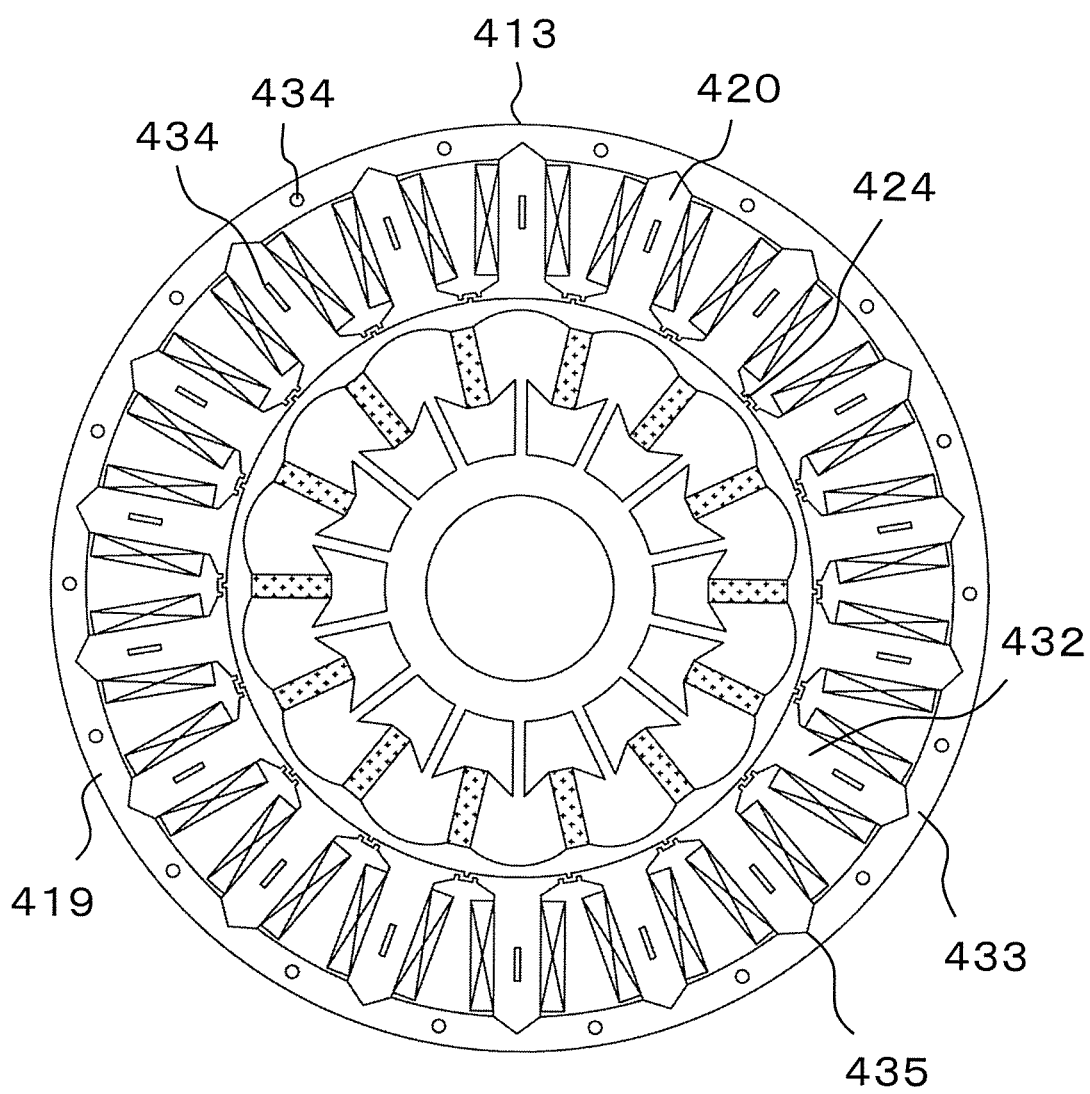
FIG. 24 is a sectional view for illustrating a rotary electric machine according to a seventh embodiment of the present invention.

FIG. 24 is a sectional view for illustrating a rotary electric machine according to a seventh embodiment of the present invention. The stator core 403 includes a stator core inner diameter portion 432 including the tooth portions 420 and the connecting portions 424 and a stator core outer diameter portion 433 including the core back portion 419. The stator core inner diameter portion 432 and the stator core outer diameter portion 433 are formed by laminating stator-core core sheets made of a magnetic material. Examples of the stator-core core sheet include a thin plate-like electromagnetic steel plate. The stator-core core sheets of the stator core inner diameter portion 432 are connected in the axial direction by caulking portions 434 arranged in the tooth portions 420, while the stator-core core sheets of the stator core outer diameter portion 433 are connected in the axial direction by caulking portions 434 arranged in the core back portion 419. The stator core 403 further includes an inner diameter portion-outer diameter portion connecting portions 435, which connect the stator core inner diameter portions 432 and the stator core outer diameter portions 433 to each other. The stator core inner diameter portion 432 and the stator core outer diameter portion 433 are connected to each other by shrink fitting, press fitting, welding, or the like.

Figure 25:
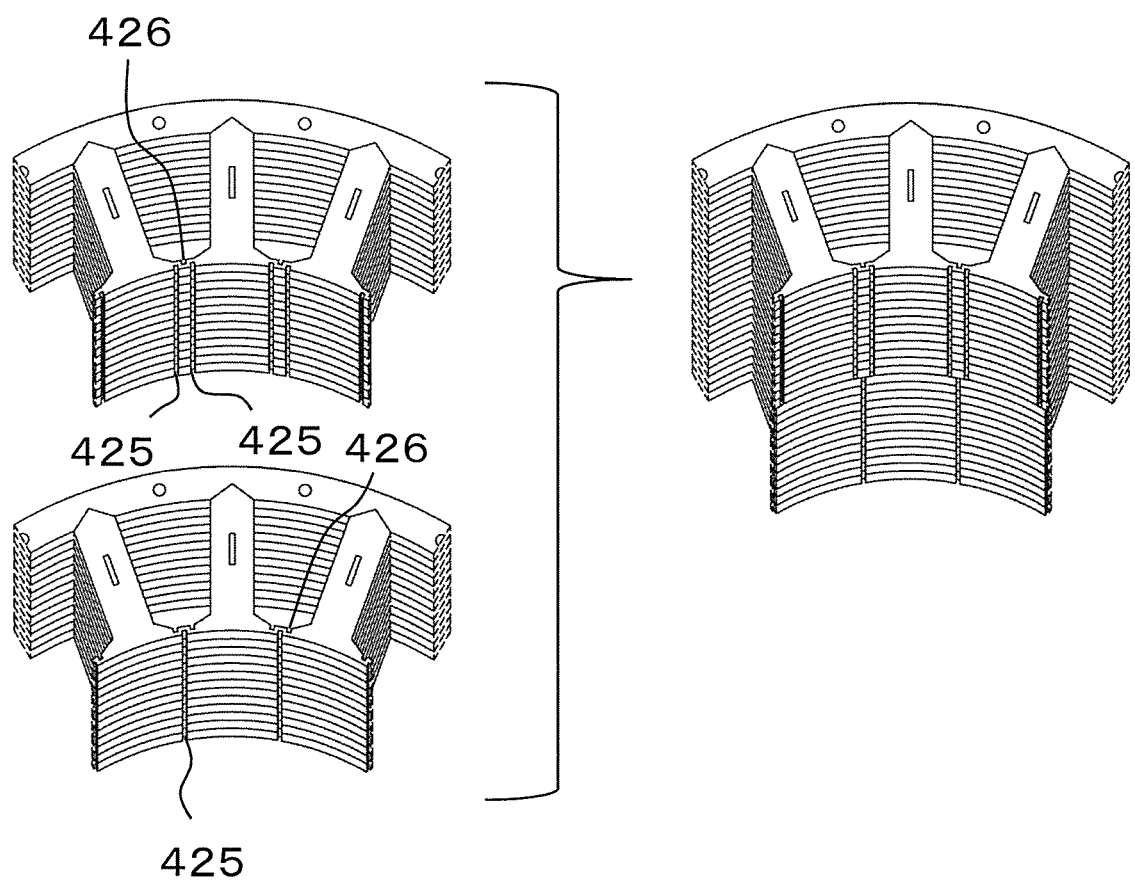
FIG. 25 is a view for illustrating laminate patterns of stator-core core sheets in a stator core of FIG. 24.

FIG. 25 is a view for illustrating a laminate pattern of the stator-core core sheets in the stator core 403 of FIG. 24. The stator core 403 is formed by laminating two kinds of stator-core core sheets having the cutout portions 425 and the slot projecting portions 426 formed at different positions from each other. In the connecting portion 424 of one of the two kinds of stator-core core sheets, the slot projecting portions 426 are arranged on both of the circumferential sides of the cutout portion 425. In the connecting portion 424 of another kind of stator-core core sheets, the cutout portions 425 are arranged on both of the circumferential sides of the slot projecting portion 426. The cutout portions 425 and the slot projecting portions 426 are arranged in the two kinds of stator-core core sheets so that the positions of the cutout portions 425 and the slot projecting portions 426 are different from each other in the laminate direction. The cutout portion 425 and the slot projecting portions 426 of the one kind of stator-core core sheets are arranged so as to overlap the connecting portions 424 of the another kind of stator-core core sheets.

Figure 26:
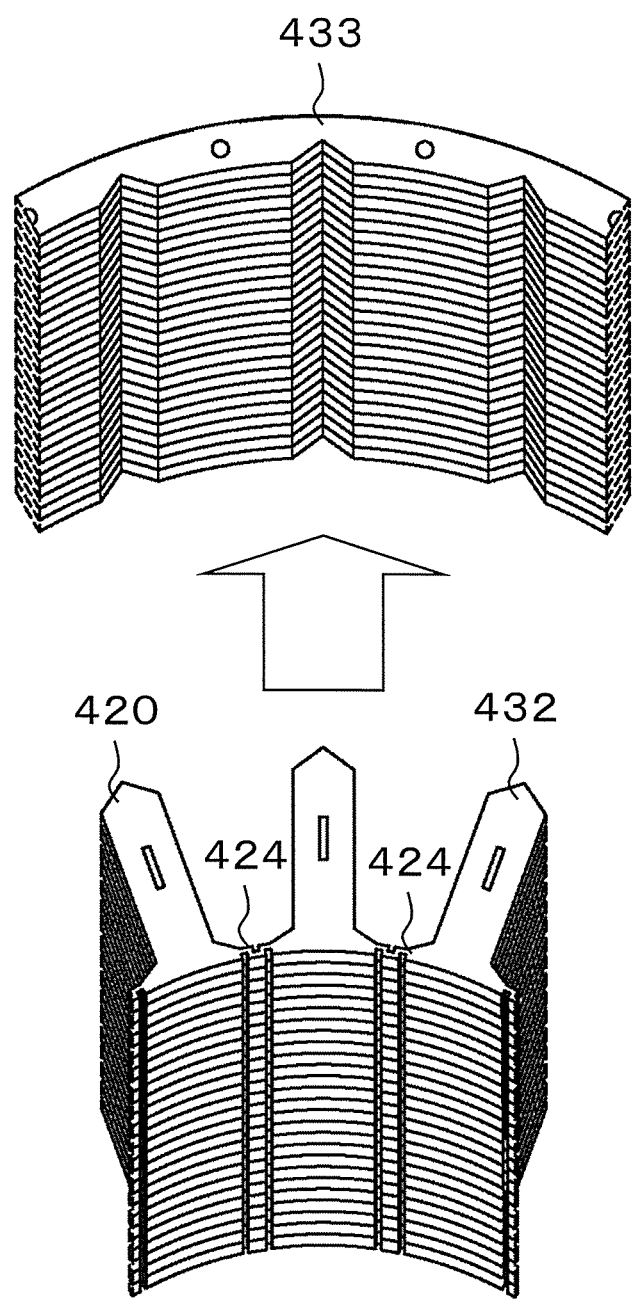
FIG. 26 is a view for illustrating part of a step of fitting a stator-core inner diameter portion of FIG. 25 inside of a stator-core outer diameter portion.

Next, a fitting step being a step of fitting the stator core inner diameter portion 432 inside of the stator core outer diameter portion 433 by press fitting, shrink fitting, or the like is described. FIG. 26 is a view for illustrating part of the step of fitting the stator core inner diameter portion 432 of FIG. 25 inside of the stator core outer diameter portion 433. In the fitting step, any one of the stator core inner diameter portion 432 having an annular shape and the stator core outer diameter portion 433 having an annular shape is moved in the axial direction relative to another thereof so that the stator core inner diameter portion 432 having the annular shape is inserted inside of the stator core outer diameter portion 433 to achieve fitting therebetween. In this manner, the stator core inner diameter portion 432 and the stator core outer diameter portion 433 are connected to each other. As a result, an integral core is formed.

Figure 27:
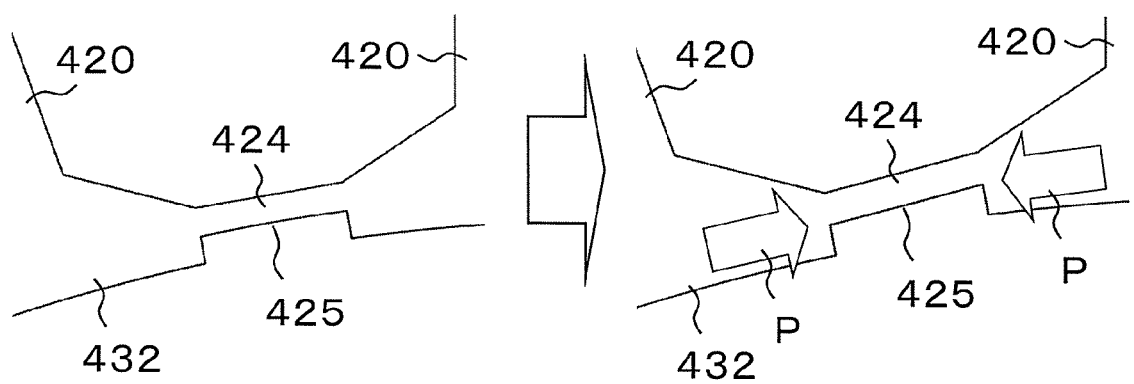
FIG. 27 is a view for illustrating a state in which force is applied to the connecting portion of the related-art example in a circumferentially compressing direction.

Because of the fitting between the stator core inner diameter portion 432 and the stator core outer diameter portion 433, a radially outward force is applied to a portion of the stator core outer diameter portion 433 at which the stator core outer diameter portion 433 is connected to the stator core inner diameter portion 432, whereas a radially inward force is applied to a portion of the stator core inner diameter portion 432 at which the stator core inner diameter portion 432 is connected to the stator core outer diameter portion 433. In particular, for the stator core inner diameter portion 432, the radially inward force is applied to the tooth portion 420 through the portion of the stator core inner diameter portion 432 at which the stator core inner diameter portion 432 is connected to the stator core outer diameter portion 433. Therefore, force is applied to the stator core inner diameter portion 432 having the annular shape in a direction in which a radial dimension thereof is reduced, that is, a radially compressing direction. As a result, force is applied to the connecting portion 424 in a circumferentially compressing direction. FIG. 27 is a view for illustrating a state in which force is applied to the connecting portion 424 of the related-art example in the circumferentially compressing direction. When a force P is applied to the connecting portion 424 of the related-art example in the circumferentially compressing direction, buckling in the circumferential direction occurs in the connecting portion 424. Due to the buckling, a large deflection occurs in the connecting portion 424. As a result, there is a problem in that the stator core inner diameter portion 432 is deformed in the radial direction. When the deformation in the radial direction occurs in the stator core inner diameter portion 432, a pulsation of permeance between the stator 405 and the rotor 415 occurs. Therefore, there is a problem in that the cogging torque is increased to increase the oscillation of the rotary electric machine.

Figure 28:
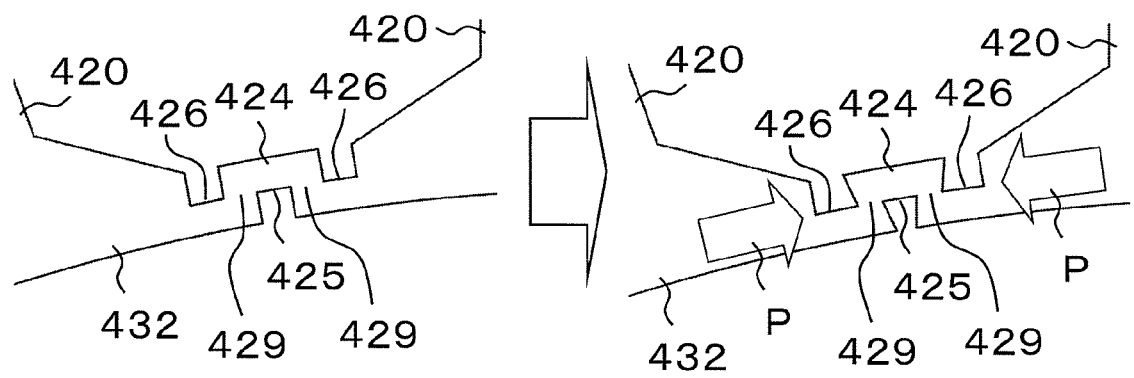
FIG. 28 is a view for illustrating a state in which force is applied to the connecting portion of FIG. 26 in the circumferentially compressing direction.

FIG. 28 is a view for illustrating a state in which the force is applied to the connecting portion 424 of FIG. 26 in the circumferentially compressing direction. Meanwhile, when the force P is applied to the connecting portion 424 of the stator core inner diameter portion 432 of the rotary electric machine according to the seventh embodiment in the circumferential compressing direction, the radial thin connecting portions 429 are deformed in the circumferential direction because of the radial thin connecting portions 429 included in the connecting portion 424. With the deformation in the circumferential direction, the deformation of the stator core inner diameter portion 432 in the radial direction is suppressed. As a result, the cogging torque can be reduced to reduce the oscillation of the rotary electric machine. When the connecting portion 424 has the plurality of radial thin connecting portions 429 as illustrated in FIG. 16, elastic force of the connecting portion 424 in the circumferential direction is further improved. As a result, the deformation of the stator core inner diameter portion 432 in the radial direction can be further suppressed.

As described above, according to the rotary electric machine of the seventh embodiment of the present invention, although the rigidity of the stator 405 is reduced due to the formation of the cutout portions 425 and the slot projecting portions 426 in the connecting portions 424, the portions of the connecting portions 424 at which the cutout portions 425 and the slot projecting portions 426 are formed are reinforced by the another type of stator-core core sheets. Thus, the strength of the inner periphery of the stator core 403, which is located on the side closer to the rotor 415, can be increased. In this manner, the rigidity of the stator 405 can be increased to reduce the oscillation of the rotary electric machine 402.

Further, the stator core 403 includes the stator core inner diameter portion 432 having the tooth portions 420 and the connecting portions 424 and the stator core outer diameter portion 433 having the core back portion 419, inside of which the stator core inner diameter portion 432 is to be fitted. Therefore, the stator core 403 can be easily manufactured.

Further, the method of manufacturing the rotary electric machine according to the seventh embodiment of the present invention includes the fitting step of fitting the stator core inner diameter portion 432 inside of the stator core outer diameter portion 433. Therefore, the stator core 403 can be easily manufactured.

Although it has been described above in the seventh embodiment that the two kinds of stator-core core sheets having the cutout portions 425 and the slot projecting portions 426 formed at different positions from each other are laminated, equivalent effects are obtained when the cutout portions 425 and the slot projecting portions 426 of the stator-core core sheets are arranged so as to overlap the connecting portions 424 of a plurality of different kinds of stator-core core sheets in the laminate direction.

Further, although it has been described above in the seventh embodiment that the plurality of stator-core core sheets of the same kind are laminated, the laminate of the stator-core core sheets is not limited thereto. For example, a plurality of different kinds of stator-core core sheets may be alternately laminated one by one.

Eighth Embodiment

Figure 29:
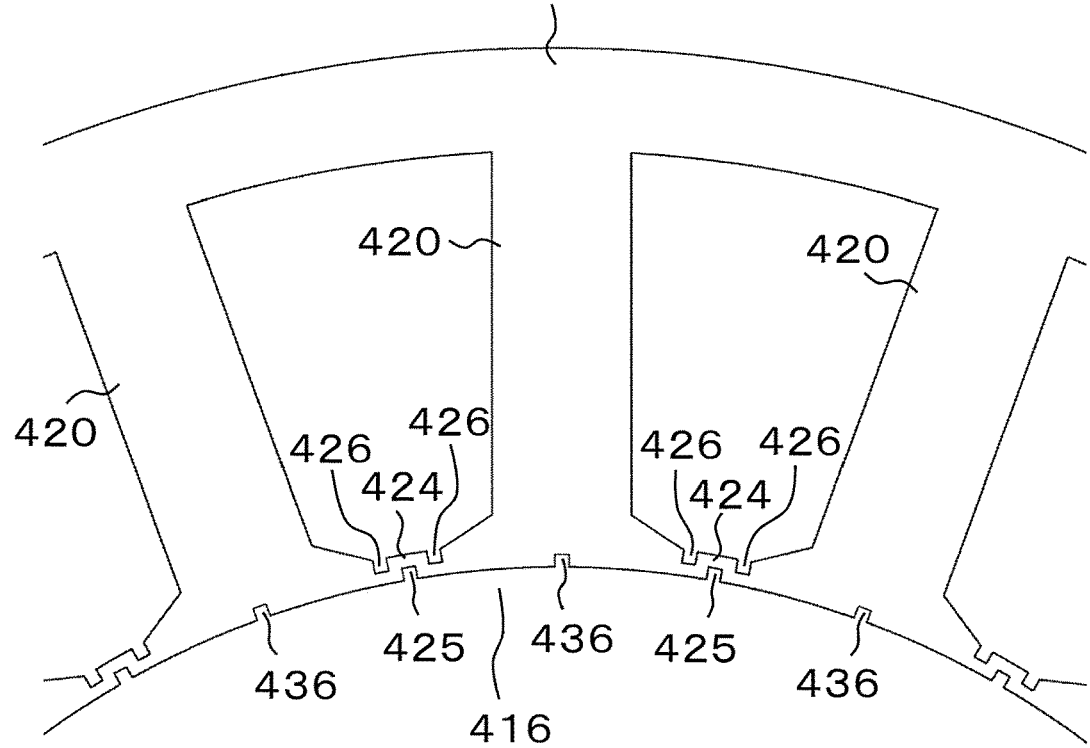
FIG. 29 is a view for illustrating a main part of a stator core of a rotary electric machine according to an eighth embodiment of the present invention.
Figure 30:
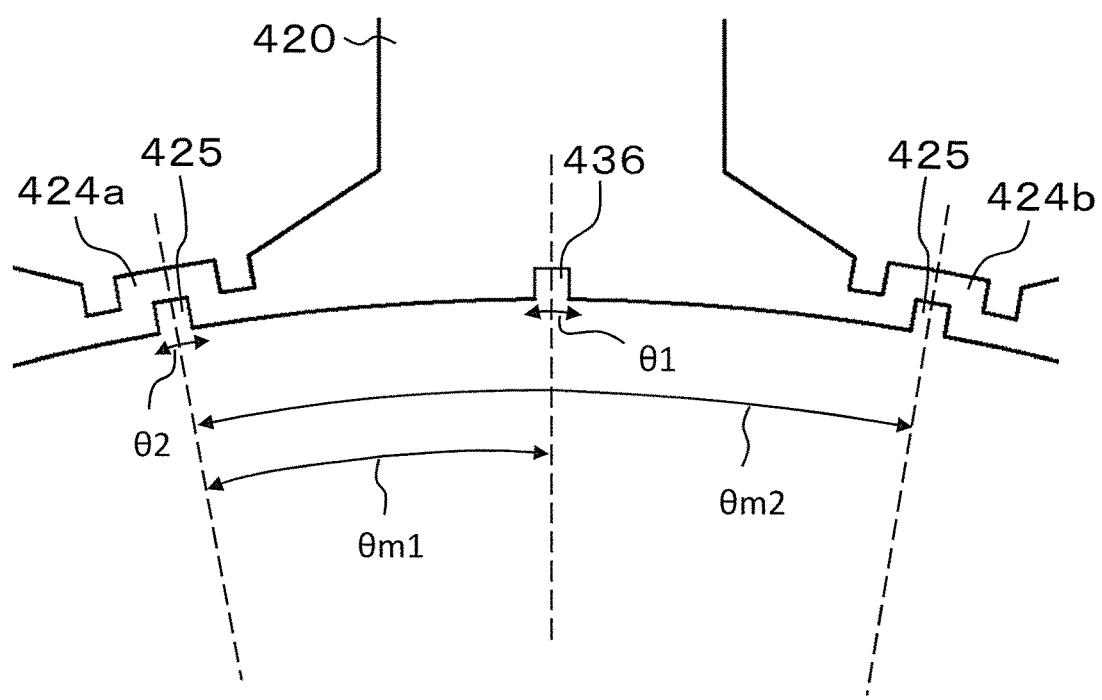
FIG. 30 is an enlarged view for illustrating a connecting portion of FIG. 29.

FIG. 29 is a view for illustrating a main part of a stator core of a rotary electric machine according to an eighth embodiment of the present invention, and FIG. 30 is an enlarged view for illustrating a connecting portion of FIG. 29. A tooth cutout portion 436 is formed in an end surface of the tooth portion 420 of the stator core 403 that is located on the side closer to the magnetic air gap portion 416. The tooth cutout portion 436 has an approximately quadrangular shape projecting radially outward from the end surface of the tooth portion 420 that is located on the side closer to the magnetic air gap portion 416. Further, the tooth cutout portion 436 is arranged in a circumferentially central portion of the tooth portion 420.

In this example, an angle of the tooth cutout portion 436 that is formed in the circumferential direction with the axial center of the rotary shaft 412 being the center is defined as $\theta 1$. The angle of the tooth cutout portion 436, which is formed in the circumferential direction with the axial center of the rotary shaft 412 being the center, is an angle between a pair of circumferential side walls of the tooth cutout portion 436 with the axial center being the center. The circumferential side walls of the tooth cutout portion 436 are portions of side walls of the tooth cutout portion 436 that are oriented in the circumferential direction.

Further, in this example, for the cutout portion 425 having a maximum circumferential dimension among the cutout portions 425 formed in the connecting portion 424, an angle of the cutout portion 425 that is formed in the circumferential direction with the axial center of the rotary shaft 412 being the center is defined as $\theta 2$. The angle of the cutout portion 425, which is formed in the circumferential direction with the axial center of the rotary shaft 412 being the center, is an angle between a pair of circumferential side walls of the cutout portion 425 with the axial center being the center. The circumferential side walls of the cutout portion 425 are portions of side walls of the cutout portion 425 that are oriented in the circumferential direction.

The formation of the cutout portion 425 in the connecting portion 424 causes a pulsation of permeance between the stator 405 and the rotor 415. When a variation occurs in the shape of the rotor 415 or a variation occurs in position, shape, and residual flux density of the permanent magnet 414, there is a problem in that the cogging torque is generated in the rotor 415 due to the pulsation of the permeance to increase the oscillation of the rotary electric machine.

Figure 31:
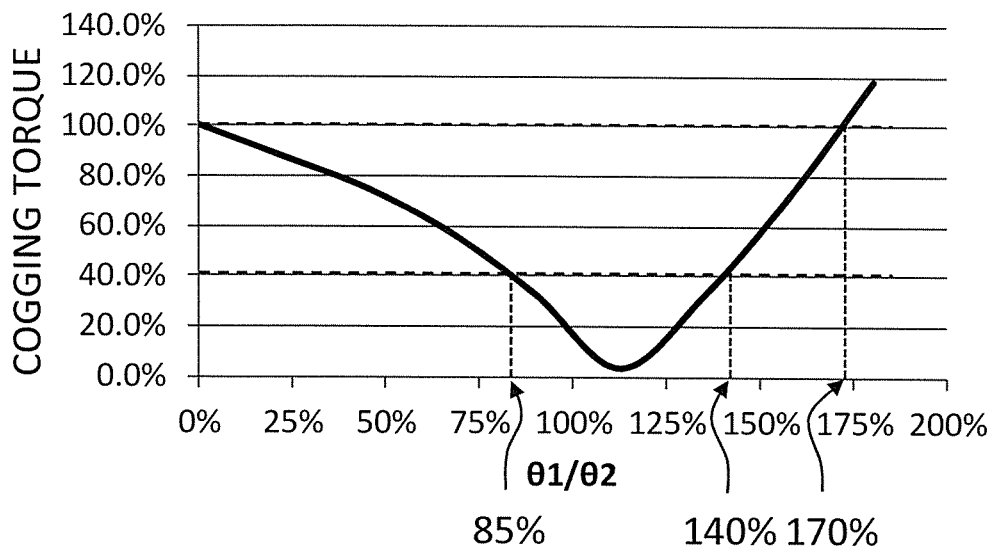
FIG. 31 is a graph for showing a cogging torque generated in a rotor when a variation occurs in shape of the rotor or a variation occurs in position, shape, and residual flux density of a permanent magnet in the rotary electric machine of FIG. 29.

FIG. 31 is a graph for showing the cogging torque generated in the rotor when the variation occurs in the shape of the rotor or the variation occurs in the position, the shape, and the residual flux density of the permanent magnet in the rotary electric machine of FIG. 29. In FIG. 31, the cogging torque obtained with $\theta 1/\theta 2$ being changed is shown. When $\theta 1/\theta 2$ is equal to zero, the tooth cutout portion 436 is not formed in the tooth portion 420. When $\theta 1/\theta 2$ is equal to or smaller than 170%, that is, equal to or smaller than 1.7, the effect to reduce the cogging torque generated in the rotor 415 is obtained in comparison to the case where the tooth cutout portion 436 is not formed in the tooth portion 420. This is because as lot-number related component of the pulsation of the permeance between the stator 405 and the rotor 415, which is generated due to the cutout portion 425 formed in the connecting portion 424, is reduced by the formation of the tooth cutout portion 436. More preferably, when $\theta 1/\theta 2$ is equal to or larger than 85% and equal to or smaller than 140%, that is, equal to or larger than 0.85 and equal to or smaller than 1.4, the cogging torque can be reduced to 40% or smaller in comparison to that in the case where the tooth cutout portion 436 is not formed in the tooth portion 420.

There is now described the cogging torque generated in the rotor 415 when the circumferential position of the tooth cutout portion 436 is changed to cause the variation in the shape of the rotor 415 or to cause the variation in the position, the shape, and the residual flux density of the permanent magnet 414. As illustrated in FIG. 30, one connecting portion 424 of a pair of connecting portions 424, which are adjacent to each other in the circumferential direction across the tooth portion 420, is referred to as a first connecting portion 424a, whereas another of the pair of connecting portions 424 is referred to as a second connecting portion 424b. An angle that is formed in the circumferential direction between a straight line connecting a circumferential center of the cutout portion 425 formed in the first connecting portion 424a and the axial center of the rotary shaft 412 and a straight line connecting a circumferential center of the cutout portion 425 formed in the second connecting portion 424b and the axial center of the rotary shaft 412 is defined as $\theta m2$. Further, an angle that is formed in the circumferential direction between the straight line connecting the circumferential center of the cutout portion 425 formed in the first connecting portion 424a and the axial center of the rotary shaft 412 and a straight line connecting a circumferential center of the tooth cutout portion 436 formed in the tooth portion 420 sandwiched between the first connecting portion 424a and the second connecting portion 424b and the axial center of the rotary shaft 412 is defined as $\theta m1$.

Figure 32:
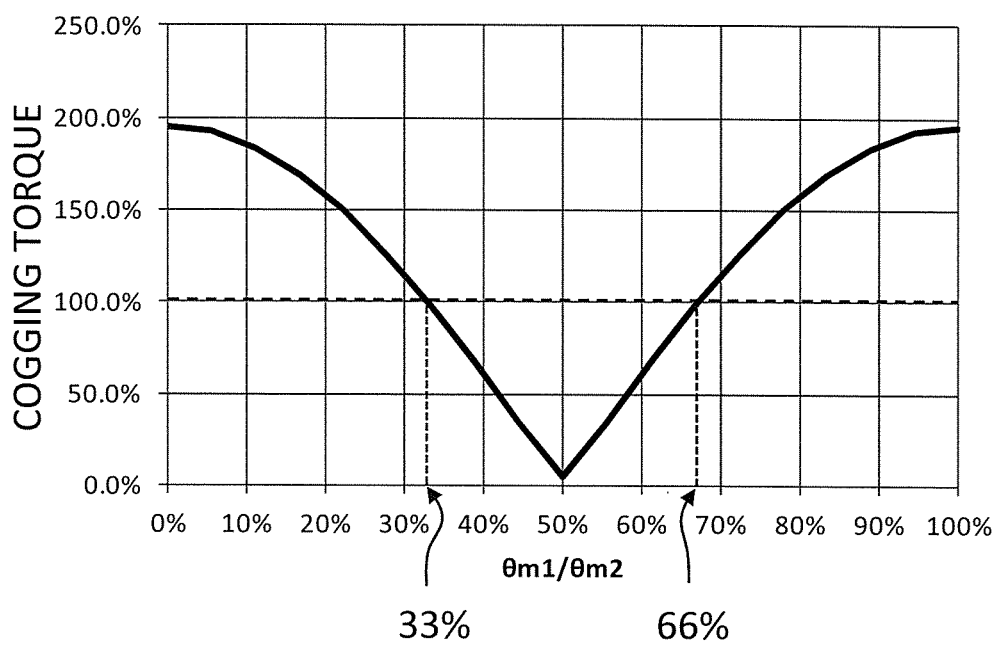
FIG. 32 is another graph for showing the cogging torque generated in the rotor when the variation occurs in the shape of the rotor or the variation occurs in the position, the shape, and the residual flux density of the permanent magnet in the rotary electric machine of FIG. 29.

FIG. 32 is a graph for showing the cogging torque generated in the rotor when the variation occurs in the shape of the rotor or the variation occurs in the position, the shape, and the residual flux density of the permanent magnet in the rotary electric machine of FIG. 29. In FIG. 32, the cogging torque obtained with $\theta m1/\theta m2$ being changed is shown. When $\theta m1/\theta m2$ is equal to or larger than 33% and equal to or smaller than 66%, that is, equal to or larger than 0.33 and equal to or smaller than 0.66, the cogging torque can be reduced in comparison to that in the case where the tooth cutout portion 436 is not formed in the tooth portion 420. Further, when $\theta m1/\theta m2$ is 50%, that is, 0.5, the cogging torque can be most reduced. In the rotary electric machine according to the eighth embodiment, the tooth cutout portion 436 is arranged in an approximately center portion of the tooth portion 420 in the circumferential direction, specifically, is arranged so that $\theta m1/\theta m2$ becomes 0.5. Therefore, the effect to most reduce the cogging torque is obtained.

As described above, according to the rotary electric machine of the eighth embodiment of the present invention, when the tooth cutout portion 436 is formed in the tooth portion 420 on the side closer to the magnetic air gap portion 416, the angle of the tooth cutout portion 436, which is formed in the circumferential direction with the axial center being the center, is θ1, and the angle of the cutout portion 425, which is formed in the circumferential direction with the axial center being the center, is θ2, θ1/θ2≤1.7 is satisfied. Thus, the cogging torque can be suppressed, and hence the oscillation of the rotary electric machine can be reduced.

Further, when the angle that is formed in the circumferential direction between the straight line connecting the circumferential center of the cutout portion 425 formed in the first connecting portion 424a and the axial line and the straight line connecting the circumferential center of the cutout portion 425 formed in the second connecting portion 424b and the axial line is θm2, and the angle that is formed in the circumferential direction between the straight line connecting the circumferential center of the cutout portion 425 formed in the first connecting portion 424a and the axial line and the straight line connecting the circumferential center of the tooth cutout portion 436 formed in the tooth portion 420 sandwiched between the first connecting portion 424a and the second connecting portion 424b and the axial line is θm1, θm1/θm2 is equal to or larger than 0.33 and equal to or smaller than 0.66. Therefore, the cogging torque can be suppressed, and hence the oscillation of the rotary electric machine can be reduced.

Although it has been described above in the eighth embodiment that the number of tooth cutout portion 436 formed in one tooth portion 420 is one, it is apparent that the same effects are obtained even when a plurality of tooth cutout portions 436 are formed in one tooth portion 420. When the plurality of tooth cutout portions 436 are formed in one tooth portion 420, the slot-number related component of the pulsation of the permeance can be further reduced. Therefore, the oscillation of the rotary electric machine can be further reduced.

Further, although the shape of the tooth cutout portion 436 is approximately quadrangular in the eighth embodiment described above, the shape of the tooth cutout portion 436 is not limited thereto. It is apparent that the same effects are obtained even when other shapes such as a triangular shape are used.

Although the inner rotor type rotary electric machine including the rotor arranged on the inner periphery side of the stator has been described as an example in each of the embodiments, equivalent effects are obtained even with an outer rotor type rotary electric machine including a rotor arranged on an outer periphery side of a stator.

REFERENCE SIGNS LIST 1 shaft, 2 torque sensor, 3 connector, 4 electric driving device, 5 connector, 6 power connector, 7 gear box, 8 housing, 9 tie rod, 10 rack boot, 401 ECU, 402 rotary electric machine, 403 stator core, 404 armature winding, 405 stator, 406 frame, 407 wall portion, 408 housing, 409 bolt, 410 bearing, 411 bearing, 412 rotary shaft, 413 rotor core, 414 permanent magnet, 415 rotor, 416 magnetic air gap portion, 417 permanent-magnet embedded portion, 418 bridge portion, 419 core back, 420 tooth portion, 421 slot portion, 423 armature coil, 424 connecting portion, 424a first connecting portion, 424b second connecting portion, 425 cutout portion, 426 slot projecting portion, 427 slot portion-side thin connecting portion, 428 magnetic air gap portion-side thin connecting portion, 429 radial thin connecting portion, 430 non-magnetic member, 431 insulator, 432 stator core inner diameter, 433 stator core outer diameter portion, 434 caulking portion, 435 inner diameter portion-outer diameter portion connecting portion, 436 tooth cutout portion, 437 flange portion

The invention claimed is:
1. A rotary electric machine, comprising:
a rotor; and
a stator including a stator core, the stator core including a core back portion having an annular shape and a plurality of tooth portions arranged at an interval in a circumferential direction of the stator to extend from the core back portion in a radial direction of the stator, the stator core having a slot portion formed between the plurality of tooth portions being adjacent to each other in the circumferential direction, the stator being arranged with respect to the rotor through a magnetic air gap portion therebetween,
wherein each of the plurality of tooth portions includes a distal end being an end located on a side of the each of the plurality of tooth portions that is closer to the rotor,
wherein the stator core further includes a connecting portion made of a magnetic material, which is formed at the distal end of each of the plurality of tooth portions and projects from the distal end of the each of the plurality of tooth portions in the circumferential direction to connect the plurality of tooth portions being adjacent to each other in the circumferential direction,
wherein the connecting portion has a cutout portion formed on a side of the connecting portion that is closer to the magnetic air gap portion,
wherein the connecting portion includes a slot portion-side thin connecting portion formed so as to be closer to the slot portion than the cutout portion,
wherein a portion of the connecting portion that is shifted in the circumferential direction from a portion of the connecting portion in which the slot portion-side thin connecting portion is formed has formed therein a slot projecting portion projecting from the slot portion toward the magnetic air gap portion with respect to the slot portion-side thin connecting portion,
wherein the connecting portion further includes:
a magnetic air gap portion-side thin connecting portion formed so as to be closer to the magnetic air gap portion than a position at which the slot projecting portion is formed; and
a radial thin connecting portion, which connects the slot portion-side thin connecting portion and the magnetic air gap portion-side thin connecting portion to each other,
wherein the slot projecting portion is arranged on each of circumferential sides of the cutout portion, or the cutout portion is arranged on each of circumferential sides of the slot projecting portion,
wherein the stator core further includes:
a stator core inner diameter portion including the plurality of tooth portions and the connecting portion; and
a stator core outer diameter portion including the core back portion,
wherein the stator core inner diameter portion is to be fitted inside the stator core outer diameter portion, and as a result of fitting the stator core inner diameter portion inside the stator core outer diameter portion, a radially inward force is applied to the stator core inner diameter portion, the radially inward force being translated into a deforming circumferentially compressing force on to the connecting portion, wherein, when the slot projecting portion is arranged on each of the circumferential sides of the cutout portion, the radial thin connecting portion is deformed so that a circumferential width of the cutout portion on the side closer to the magnetic air gap portion is reduced when the deforming circumferentially compressing force is applied to the connecting portion, wherein, when the cutout portion is arranged on each of the circumferential sides of the slot projecting portion, the radial thin connecting portion is deformed so that a circumferential width of the slot projecting portion on the side closer to the slot portion is reduced when the deforming circumferentially compressing force is applied to the connecting portion, wherein the stator core includes a plurality of kinds of stator-core core sheets laminated one on another, and wherein the cutout portion or the slot projecting portion formed in one of the plurality of kinds of stator-core core sheets being laminated one on another is arranged so as to be shifted in the circumferential direction from the cutout portion or the slot projecting portion formed in another of the plurality of kinds of stator-core core sheets.

2. A rotary electric machine according to claim 1, wherein the cutout portions or the slot projecting portions are arranged mirror-symmetric with respect to a plane that passes through a center of each of the plurality of tooth portions and contains an axial center of the stator.

3. A rotary electric machine according to claim 1, wherein the connecting portions each having the cutout portion and the slot projecting portion are arranged so as to be rotationally symmetric with respect to an axial center of the stator as a center.

4. A rotary electric machine according to claim 1, wherein the cutout portion and the slot projecting portion are formed in the connecting portion so as to be arranged alternately in the circumferential direction.

5. A rotary electric machine according to claim 4, wherein a sum of a number of the cutout portions formed in the connecting portion and a number of the slot projecting portions formed in the connecting portion is an odd number.

6. A rotary electric machine according to claim 1, wherein a portion of the slot projecting portion that projects most toward the magnetic air gap portion is arranged so as to be closer to the magnetic air gap portion than a portion of the cutout portion that projects most toward the slot portion.

7. A rotary electric machine according to claim 1, wherein at least one of the cutout portion and the slot projecting portion has a non-magnetic member inserted thereinto.

8. A rotary electric machine according to claim 1,
wherein the slot projecting portion has a non-magnetic member inserted thereinto, and
wherein the non-magnetic member is integral with an insulator inserted between an armature coil and each of the plurality of tooth portions.

9. An electric power steering device, comprising the rotary electric machine of claim 1.

10. A rotary electric machine, comprising:
a rotor; and
a stator including a stator core, the stator core including a core back portion having an annular shape and a plurality of tooth portions arranged at an interval in a circumferential direction of the stator to extend from the core back portion in a radial direction of the stator, the stator core having a slot portion formed between the plurality of tooth portions being adjacent to each other in the circumferential direction, the stator being arranged with respect to the rotor through a magnetic air gap portion therebetween, wherein each of the plurality of tooth portions includes a distal end being an end located on a side of the each of the plurality of tooth portions that is closer to the rotor, wherein the stator core further includes a connecting portion made of a magnetic material, which is formed at the distal end of each of the plurality of tooth portions and projects from the distal end of the each of the plurality of tooth portions in the circumferential direction to connect the plurality of tooth portions being adjacent to each other in the circumferential direction, wherein the connecting portion has a cutout portion formed on a side of the connecting portion that is closer to the magnetic air gap portion, wherein the connecting portion includes a slot portion-side thin connecting portion formed so as to be closer to the slot portion than the cutout portion, wherein a portion of the connecting portion that is shifted in the circumferential direction from a portion of the connecting portion in which the slot portion-side thin connecting portion is formed has formed therein a slot projecting portion projecting from the slot portion toward the magnetic air gap portion with respect to the slot portion-side thin connecting portion, wherein the connecting portion further includes:
a magnetic air gap portion-side thin connecting portion formed so as to be closer to the magnetic air gap portion than a position at which the slot projecting portion is formed; and
a radial thin connecting portion, which connects the slot portion-side thin connecting portion and the magnetic air gap portion-side thin connecting portion to each other, wherein the slot projecting portion is arranged on each of circumferential sides of the cutout portion, or the cutout portion is arranged on each of circumferential sides of the slot projecting portion, wherein the stator core further includes:
a stator core inner diameter portion including the plurality of tooth portions and the connecting portion; and
a stator core outer diameter portion including the core back portion, wherein the stator core inner diameter portion is to be fitted inside the stator core outer diameter portion, and as a result of fitting the stator core inner diameter portion inside the stator core outer diameter portion, a radially inward force is applied to the stator core inner diameter portion, the radially inward force being translated into a deforming circumferentially compressing force on to the connecting portion, wherein, when the slot projecting portion is arranged on each of the circumferential sides of the cutout portion, the radial thin connecting portion is deformed so that a circumferential width of the cutout portion on the side closer to the magnetic air gap portion is reduced when the deforming circumferentially compressing force is applied to the connecting portion, wherein, when the cutout portion is arranged on each of the circumferential sides of the slot projecting portion, the radial thin connecting portion is deformed so that a circumferential width of the slot projecting portion on the side closer to the slot portion is reduced when the deforming circumferentially compressing force is applied to the connecting portion, wherein each of the plurality of tooth portions has a tooth cutout portion formed therein on a side of the each of the plurality of tooth portions that is closer to the magnetic air gap portion, and wherein $\theta1/\theta2 \leq 1.7$ is satisfied, where $\theta1$ represents an angle of the tooth cutout portion that is formed in the circumferential direction with an axial center being a center, and $\theta2$ represents an angle of the cutout portion that is formed in the circumferential direction with the axial center being the center.

11. A rotary electric machine according to claim 10, wherein $\theta m1/\theta m2$ is equal to or larger than 0.33 and equal to or smaller than 0.66, where:

$\theta m2$ represents an angle that is formed in the circumferential direction between a straight line connecting an axial line and a circumferential center of the cutout portion formed in a first connecting portion being one of a pair of connecting portions being adjacent to each other in the circumferential direction across one of the plurality of tooth portions and a straight line connecting the axial line and a circumferential center of the cutout portion formed in a second connecting portion being another of the pair of connecting portions; and $\theta m1$ represents an angle that is formed in the circumferential direction between the straight line connecting the axial line and the circumferential center of the cutout portion formed in the first connecting portion and a straight line connecting the axial line and a circumferential center of the tooth cutout portion formed in the one of the plurality of tooth portions sandwiched between the first connecting portion and the second connecting portion.

12. A method of manufacturing a rotary electric machine, comprising:

providing a rotor;

providing a stator including a stator core, the stator core including a core back portion having an annular shape and a plurality of tooth portions arranged at an interval in a circumferential direction of the stator to extend from the core back portion in a radial direction of the stator, the stator core having a slot portion formed between the plurality of tooth portions being adjacent to each other in the circumferential direction;

arranging the stator with respect to the rotor through a magnetic air gap portion therebetween;

forming each of the plurality of tooth portions to include a distal end being an end located on a side of the each of the plurality of tooth portions that is closer to the rotor;

providing the stator core to include a connecting portion made of a magnetic material, which is formed at the distal end of each of the plurality of tooth portions and projects from the distal end of the each of the plurality of tooth portions in the circumferential direction to connect the plurality of tooth portions being adjacent to each other in the circumferential direction, forming the connecting portion with a cutout portion formed on a side of the connecting portion that is closer to the magnetic air gap portion, the connecting portion including a slot portion-side thin connecting portion formed so as to be closer to the slot portion than the cutout portion, a portion of the connecting portion that is shifted in the circumferential direction from a portion of the connecting portion in which the slot portion-side thin connecting portion having formed therein a slot projecting portion projecting from the slot portion toward the magnetic air gap portion with respect to the slot portion-side thin connecting portion, the connecting portion further including: a magnetic air gap portion-side thin connecting portion formed so as to be closer to the magnetic air gap portion than a position at which the slot projecting portion is formed; and a radial thin connecting portion, which connects the slot portion-side thin connecting portion and the magnetic air gap portion-side thin connecting portion to each other, the slot projecting portion being arranged on each of circumferential sides of the cutout portion, or the cutout portion being arranged on each of circumferential sides of the slot projecting portion, the stator core further including: a stator core inner diameter portion including the plurality of tooth portions and the connecting portion; and a stator core outer diameter portion having the core back portion, inside of which the stator core inner diameter portion is to be fitted to apply a radially inward force to the stator core inner diameter portion; and fitting the stator core inner diameter portion inside of the stator core outer diameter portion, wherein, as a result of fitting the stator core inner diameter portion inside of the stator core outer diameter portion, a radially inward force is translated into a deforming circumferentially compressing force on to the connecting portion, wherein, when the slot projecting portion is arranged on each of the circumferential sides of the cutout portion, the radial thin connecting portion is deformed so that a circumferential width of the cutout portion on the side closer to the magnetic air gap portion is reduced when the deforming circumferentially compressing force is applied to the connecting portion, wherein, when the cutout portion is arranged on each of the circumferential sides of the slot projecting portion, the radial thin connecting portion is deformed so that a circumferential width of the slot projecting portion on the side closer to the slot portion is reduced when the deforming circumferentially compressing force is applied to the connecting portion, wherein the stator core includes a plurality of kinds of stator-core core sheets laminated one on another, and wherein the cutout portion or the slot projecting portion formed in one of the plurality of kinds of stator-core core sheets being laminated one on another is arranged so as to be shifted in the circumferential direction from the cutout portion or the slot projecting portion formed in another of the plurality of kinds of stator-core core sheets.

* * * * *